US012449754B2

(12) United States Patent
Kawamoto et al.

(10) Patent No.: US 12,449,754 B2
(45) Date of Patent: Oct. 21, 2025

(54) IMAGE FORMING APPARATUS

(71) Applicant: FUJIFILM Business Innovation Corp., Tokyo (JP)

(72) Inventors: Yuka Kawamoto, Kanagawa (JP); Yoshiteru Yamada, Kanagawa (JP); Daisuke Tano, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 18/804,425

(22) Filed: Aug. 14, 2024

(65) Prior Publication Data

US 2025/0291299 A1 Sep. 18, 2025

(51) Int. Cl.

| | |
|---|---|
| ***G03G 21/00*** | (2006.01) |
| ***G03G 9/08*** | (2006.01) |
| ***G03G 9/093*** | (2006.01) |
| ***G03G 15/16*** | (2006.01) |

(52) U.S. Cl.

CPC ....... *G03G 21/0017* (2013.01); *G03G 9/0819* (2013.01); *G03G 9/09335* (2013.01); *G03G 15/161* (2013.01)

(58) Field of Classification Search

CPC ............. G03G 21/0017; G03G 9/0819; G03G 9/09335; G03G 15/161

See application file for complete search history.

(56) References Cited

U.S. PATENT DOCUMENTS 9,026,027 B2 5/2015 Tanoue et al.
2004/0141779 A1* 7/2004 Yanagida ........... G03G 21/0017 399/350
2005/0141923 A1* 6/2005 Ota .................... G03G 21/0017 399/175
2014/0321895 A1 10/2014 Tanoue et al.
2015/0125177 A1* 5/2015 Yu ...................... G03G 21/0017 427/430.1
2015/0220009 A1* 8/2015 Sato ..................... G03G 9/0819 399/262
2020/0292969 A1* 9/2020 Sekiya ................. G03G 15/161
2024/0053700 A1 2/2024 Ohmori et al.

FOREIGN PATENT DOCUMENTS

JP 2001-051565 A 2/2001
JP 2014-232312 A 12/2014
JP 2022-164315 A 10/2022

* cited by examiner

*Primary Examiner* — Sandra Brase
(74) *Attorney, Agent, or Firm* — Oliff PLC

(57) ABSTRACT

An image forming apparatus includes an electrostatic image developer including a toner including toner particles, the toner particles including a release agent, an amount of the release agent present in a region that extends 800 nm below surfaces of the toner particles being 70% or more of the total amount of the release agent included in the toner particles, the release agent having a melting temperature of 65° C. or more and 80° C. or less; a member that is to be cleaned; and a cleaning blade arranged to come into contact with an outer peripheral surface of the member, the cleaning blade being capable of removing the toner adhered on a surface of the member, the cleaning blade including a contact portion arranged to come into contact with the member, the contact portion including a polyurethane, the contact portion having a hardness of 85° or more and 95° or less and a plastic deformation power of 12% or less, a Si content at a surface of the contact portion being 15 atm % or more.

7 Claims, 2 Drawing Sheets

IMAGE FORMING APPARATUS

CROSS-REFERENCE TO RELATED APPLICATIONS

This application is based on and claims priority under 35 USC 119 from Japanese Patent Application No. 2024-039969 filed Mar. 14, 2024.

BACKGROUND

(i) Technical Field

The present disclosure relates to an image forming apparatus.

(ii) Related Art

Electrophotographic image forming apparatuses (e.g., a copying machine, a facsimile, and a printer) form an image by transferring a toner image formed on the surface of an image holding member onto the surface of a recording medium and fixing the toner image to the recording medium. When a toner image is transferred to a recording medium, for example, an intermediate transfer body is used.

The image holding member, the intermediate transfer body, and the like are cleaned using a cleaning blade.

For example, Japanese Unexamined Patent Application Publication No. 2001-051565 discloses a cleaning blade produced by cutting a tabular body formed of a cured product of a polyurethane resin composition into shape, the cleaning blade having an edge surface formed as a result of cutting of the tabular body, the edge surface including silicon atoms (Si) as a result of deposition and oxygenation of an organic siloxane, wherein the content of silicon atoms (Si) at the edge surface is 4 atom % or more.

Japanese Unexamined Patent Application Publication No. 2014-232312 discloses a cleaning blade composed of a polyester urethane rubber and brought into contact with a member that is to be cleaned in order to clean the surface of the member, wherein, when the IR spectrum of a portion of the surface of the cleaning blade which is brought into contact with the member, the portion being composed of the polyester urethane rubber, is measured by μATR, the ratio $I_{SI}/I_{SE}$ of the intensity $I_{SI}$ of the C—N peak (1,411 $cm^{-1}$) derived from isocyanurate groups of the polyester urethane rubber to the intensity $I_{SE}$ of the C═O peak (1,726 $cm^{-1}$) derived from ester groups of the polyester urethane rubber is 0.65 or more and 2.50 or less, and a siloxane compound represented by a specific structure is present on the surface of the contact portion which is composed of the polyester urethane rubber.

Japanese Unexamined Patent Application Publication No. 2022-164315 discloses a cleaning blade that includes a strip-shaped elastic blade and a support member that supports the clastic blade, the cleaning blade being capable of removing a residue from the surface of a member that is to be cleaned by bringing the ridge edge of the elastic blade into contact with the moving member, wherein the surface-layer portion of the elastic blade which includes at least the ridge edge portion is composed of a rubber having a hysteresis loss ratio of 15% or less.

SUMMARY

Aspects of non-limiting embodiments of the present disclosure relate to an image forming apparatus including an electrostatic image developer including a toner including toner particles, the toner particles including a release agent, an amount of the release agent present in a region that extends 800 nm below surfaces of the toner particles being 70% or more of the total amount of the release agent included in the toner particles, the release agent having a melting temperature of 65° C. or more and 80° C. or less; a member that is to be cleaned; and a cleaning blade arranged to come into contact with an outer peripheral surface of the member, the cleaning blade being capable of removing the toner adhered on a surface of the member, which may reduce the likelihood of colored streaks being formed as a result of faulty cleaning while achieving low-temperature fixability, compared with the case where the cleaning blade includes a contact portion arranged to come into contact with the member, the contact portion includes a polyurethane, and the contact portion has a hardness of less than 85° or more than 95° or less or a plastic deformation power of more than 12%, or a Si content at a surface of the contact portion is less than 15 atm %.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including an electrostatic image developer including a toner including toner particles, the toner particles including a release agent, an amount of the release agent present in a region that extends 800 nm below surfaces of the toner particles being 70% or more of the total amount of the release agent included in the toner particles, the release agent having a melting temperature of 65° C. or more and 80° C. or less; a member that is to be cleaned; and a cleaning blade arranged to come into contact with an outer peripheral surface of the member, the cleaning blade being capable of removing the toner adhered on a surface of the member, the cleaning blade including a contact portion arranged to come into contact with the member, the contact portion including a polyurethane, the contact portion having a hardness of 85° or more and 95° or less and a plastic deformation power of 12% or less, a Si content at a surface of the contact portion being 15 atm % or more.

BRIEF DESCRIPTION OF THE DRAWINGS

Exemplary embodiments of the present disclosure will be described in detail based on the following figures, wherein.

DETAILED DESCRIPTION

Figure 1:
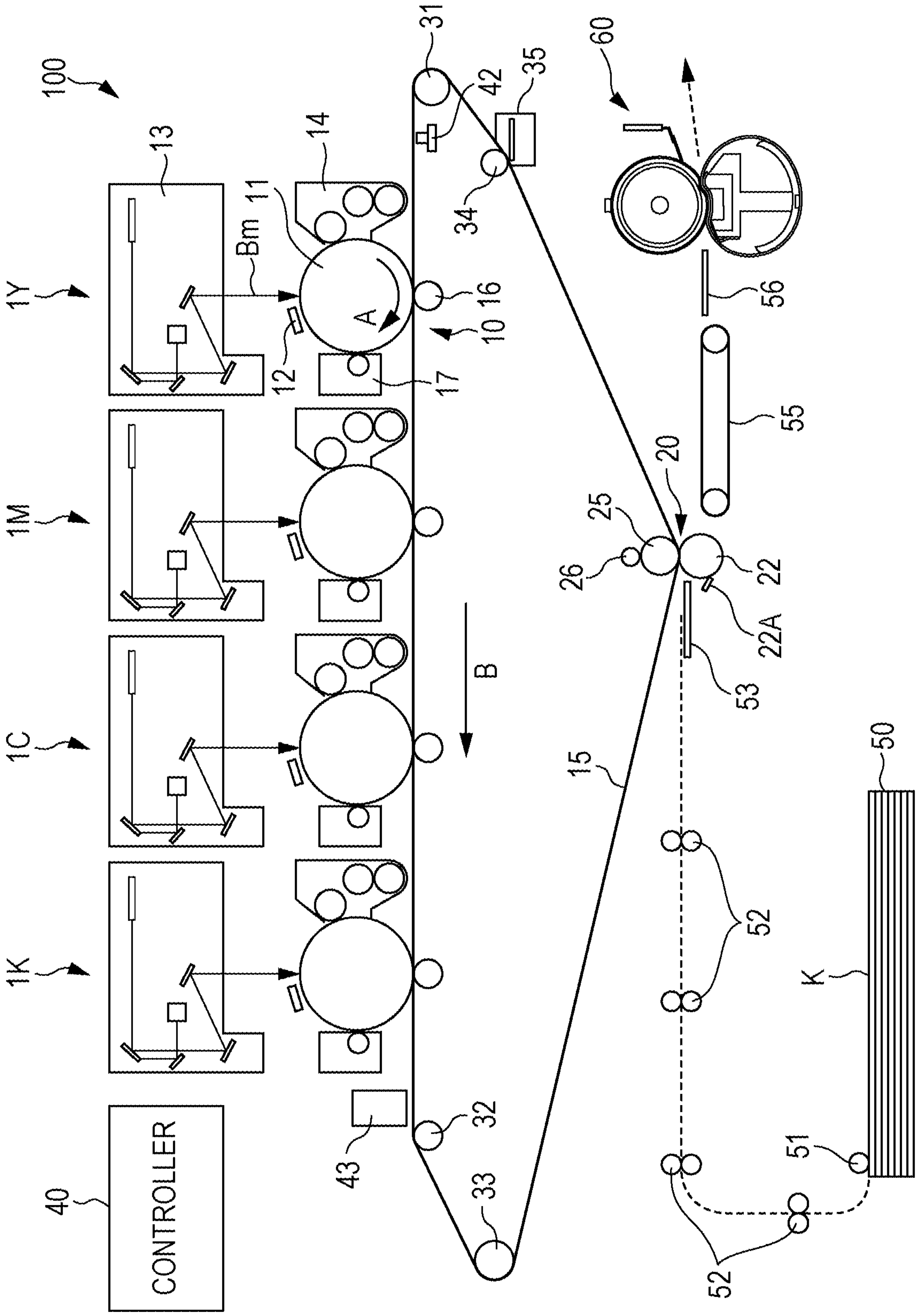
FIG. 1 is a schematic diagram illustrating an image forming apparatus according to an exemplary embodiment.

Exemplary embodiments of the present disclosure are described below. It should be noted that the following description and Examples are illustrative of the exemplary embodiments but not restrictive of the scope of the exemplary embodiments.

In the exemplary embodiments, when numerical ranges are described in a stepwise manner, the upper or lower limit of a numerical range may be replaced with the upper or lower limit of another numerical range, respectively. In the exemplary embodiments, the upper or lower limit of a numerical range may also be replaced with a value described in Examples below.

In the exemplary embodiments, the term "step" refers not only to an individual step but also to a step that is not distinguishable from other steps but achieves the intended purpose of the step.

In the exemplary embodiments, when an exemplary embodiment is described with reference to a drawing, the structure of the exemplary embodiment is not limited to the structure illustrated in the drawing. The sizes of the members illustrated in the attached drawing are conceptual and do not limit the relative relationship among the sizes of the members.

Each of the components described in the exemplary embodiments may include a plurality of types of substances that correspond to the component. In the exemplary embodiments, in the case where a composition includes a plurality of substances that correspond to a component of the composition, the content of the component in the composition is the total content of the substances in the composition unless otherwise specified.

Image Forming Apparatus

An image forming apparatus according to an exemplary embodiment includes:

an electrostatic image developer including a toner:

a member that is to be cleaned (hereinafter, referred to as "target member"); and a cleaning blade arranged to come into contact with the outer peripheral surface of the target member, the cleaning blade being capable of removing the toner adhered on the surface of the target member.

The toner includes toner particles. The toner particles include a release agent. The amount of the release agent present in a region that extends 800 nm below the surfaces of the toner particles is 70% or more of the total amount of the release agent included in the toner particles. Moreover, the release agent has a melting temperature of 65° C. or more and 80° C. or less.

The cleaning blade includes a contact portion arranged to come into contact with the target member (hereinafter, referred to as "blade contact portion"). The contact portion includes a polyurethane. The contact portion has a hardness of 85° or more and 95° or less and a plastic deformation power of 12% or less. Furthermore, the Si content at the surface of the contact portion is 15 atm % or more. A cleaning blade having the above-described properties is referred to as "specific cleaning blade".

The image forming apparatus according to the exemplary embodiment, which has the above-described structure, may reduce the likelihood of colored streaks being formed as a result of faulty cleaning while achieving low-temperature fixability. It is considered that the reasons are as described below.

Toner particles including a release agent such that the amount of the release agent present in a region that extends 800 nm below the surfaces of the toner particles is 70% or more of the total amount of the release agent included in the toner particles, the release agent having a melting temperature of 65° C. or more and 80° C. or less, are toner particles including a low-melting-temperature release agent arranged in the surface layers thereof (hereinafter, these toner particles are referred to also as "low-temperature fixing toner particles"). A toner including the low-temperature fixing toner particles (hereinafter, this toner is referred to also as "low-temperature fixing toner") is excellent in terms of low-temperature fixability.

Since the heat resistance of a low-temperature fixing toner is likely to degrade, the surfaces of low-temperature fixing toner particles are likely to become softened and particles of an external additive are likely to be buried therein accordingly. In particular, when the formation of an image having a low area coverage is repeated in a high-temperature, high-humidity environment, a large mechanical load is applied to the low-temperature fixing toner in a developing device. This increases the likelihood of external additive particles being buried in the low-temperature fixing toner particles.

In such a case, the amount of external additive particles liberated from the toner particles in the blade contact portion is reduced and, accordingly, the coefficient of friction between a target member and a cleaning blade is increased.

When the coefficient of friction of the blade contact portion is increased, the behavior of the edge of the cleaning blade becomes unstable. This may cause faulty cleaning and pass-through of toner particles. As a result, colored streaks may be formed due to faulty cleaning.

There has been attempt to stabilize the behavior of the edge of the blade by reducing the coefficient of friction between the target member and the cleaning blade and increasing the hardness of the cleaning blade. However, since the hysteresis loss is likely to increase with an increase in the hardness of the cleaning blade, when the blade contact portion is locally drawn, it may fail to recover its original state and, consequently, pass-through of toner particles may occur.

Accordingly, in the image forming apparatus according to the exemplary embodiment, the Si content at the surface of the blade contact portion of the cleaning blade is limited to 15 atm % or more in order to achieve the reduction in the coefficient of friction by Si.

In addition, the hardness of the blade contact portion is limited to 85° or more and 95° or less in order to achieve high hardness. Furthermore, the plastic deformation power of the blade contact portion is limited to 12% or less in order to achieve low hysteresis loss. This enables the behavior of the edge of the cleaning blade to be stabilized even when the coefficient of friction of the blade contact portion is increased.

As a result, the likelihood of colored streaks being formed as a result of faulty cleaning may be reduced even when a low-temperature fixing toner is used.

It is considered that, for the above reasons, the image forming apparatus according to the exemplary embodiment may reduce the likelihood of colored streaks being formed as a result of faulty cleaning while achieving low-temperature fixability.

Details of the image forming apparatus according to the exemplary embodiment are described below.

Specific examples of the image forming apparatus according to this exemplary embodiment include an image forming apparatus including an image holding member; a charging device that charges the surface of the image holding member; an electrostatic image formation device that forms an electrostatic image on the surface of the image holding member; a developing device that includes an electrostatic image developer and develops the electrostatic image formed on the surface of the image holding member with the electrostatic image developer to form a toner image; a transfer device that transfers the toner image formed on the surface of the image holding member onto the surface of a recording medium; a fixing device that fixes the toner image transferred on the surface of the recording medium; and a cleaning device including a cleaning blade arranged to come into contact with the outer peripheral surface of the image holding member, the cleaning blade being capable of removing toner particles adhered on the surface of the image holding member.

An electrostatic image developer having the above-described low-temperature fixing toner is used as an electrostatic image developer. An image holding member is used as a target member. The above-described specific cleaning blade is used as a cleaning blade.

The image forming apparatus according to this exemplary embodiment may be any image forming apparatus known in the related art, such as a direct-transfer image forming apparatus in which a toner image formed on the surface of an image holding member is directly transferred to a recording medium; an intermediate-transfer image forming apparatus in which a toner image formed on the surface of an image holding member is transferred onto the surface of an intermediate transfer body in the first transfer step and the toner image transferred on the surface of the intermediate transfer body is transferred onto the surface of a recording medium in the second transfer step; an image forming apparatus including a cleaning device that cleans the surface of the image holding member subsequent to the transfer of the toner image and before the image holding member is again charged; and an image forming apparatus including an eliminating device that eliminates static by irradiating the surface of an image holding member with erasing light subsequent to the transfer of the toner image and before the image holding member is again charged.

In the case where the image forming apparatus according to this exemplary embodiment is the intermediate-transfer image forming apparatus, the transfer device may be constituted by, for example, an intermediate transfer body having a surface to which a toner image is transferred, a first transfer device that transfers a toner image formed on the surface of the image holding member onto the surface of the intermediate transfer body in the first transfer step, and a second transfer device that transfers the toner image transferred on the surface of the intermediate transfer body onto the surface of a recording medium in the second transfer step.

In the case where the image forming apparatus is the intermediate-transfer image forming apparatus, at least one of an image holding member and an intermediate transfer body is used as a target member.

In the image forming apparatus according to the exemplary embodiment, for example, the target member, the developing device, and the cleaning device may constitute a cartridge structure (i.e., process cartridge) detachably attachable to an image forming apparatus.

In other words, the image forming apparatus according to the exemplary embodiment may be an image forming apparatus that includes a process cartridge detachably attachable to the image forming apparatus, the process cartridge including the target member, the developing device, and the cleaning device.

Member that is to be Cleaned

For example, at least one of an image holding member and an intermediate transfer body may be used as a member that is to be cleaned (i.e., a target member).

The target member may be a known member such that a toner adhered on the surface thereof is removed with a cleaning blade, such as a sheet transportation belt or a second transfer belt.

Image Holding Member

The image holding member includes, for example, a conductive base, an undercoat layer disposed on the conductive base, and a photosensitive layer disposed on the undercoat layer. The photosensitive layer may be constituted by two layers, that is, a charge generation layer and a charge transport layer. The photosensitive layer may be either an organic or inorganic photosensitive layer. The image holding member may include a protective layer disposed on the photosensitive layer.

Intermediate Transfer Body

The intermediate transfer body may be, for example, an intermediate transfer belt. The intermediate transfer body may be an intermediate transfer roller.

Examples of the intermediate transfer belt include a single-layer body consisting of a polyimide-based resin layer and a multilayer body including a polyimide-based resin layer serving as a top surface layer.

The intermediate transfer belt may have an outer peripheral surface constituted by a polyimide-based resin layer.

In the case where the intermediate transfer belt is a multilayer body including a polyimide-based resin layer serving as a top surface layer, an intermediate transfer belt that includes a resin substrate layer and a polyimide-based resin layer disposed thereon is used. An intermediate layer (e.g., an elastic layer) may be interposed between the substrate layer and the polyimide-based resin layer.

The resin substrate layer and the intermediate layer (e.g., an elastic layer) may be selected from the layers for intermediate transfer belts which are known in the related art.

The polyimide-based resin layer includes, for example, a polyimide-based resin and conductive carbon particles. The polyimide-based resin layer may include a release agent.

The polyimide-based resin layer may include another component known in the related art as needed.

Note that the term "polyimide-based resin layer" used herein refers to a layer in which the content of a polyimide-based resin is the highest by mass among the components of the resin layer.

The term "polyimide-based resin" used herein refers to a resin that includes a structural unit having an imide linkage.

Examples of the polyimide-based resin include a polyimide resin, a polyamide imide resin, and a polyether imide resin.

Among these polyimide-based resins, a polyimide resin and a polyamide imide resin are preferable, and a polyimide resin is more preferable in consideration of maintenance of cleaning ability.

Examples of the conductive carbon particles include carbon black particles.

Examples of the carbon black include Ketjenblack, oil furnace black, channel black, and acetylene black. The carbon black particles may be carbon black particles the surfaces of which have been treated (hereinafter, such carbon black particles may be referred to as "surface treated carbon black particles").

The surface treated carbon black particles are produced by attaching a carboxyl group, a quinone group, a lactone group, a hydroxyl group, or the like to the surfaces of the carbon black particles. Examples of a method for treating the surfaces of the carbon black particles include an air oxidation method in which carbon black particles are contacted with air in a high temperature atmosphere; a method in which carbon black particles are caused to react with a nitrogen oxide or ozone at normal temperature (e.g., 22° C.); and a method in which carbon black particles are subjected to air oxidation in a high temperature atmosphere and subsequently oxidized with ozone at a low temperature.

Cleaning Blade

The cleaning blade has a blade contact portion including a polyurethane.

The cleaning blade may have, for example, a single-layer structure, a two-layer structure, a structure consisting of three or more layers, or another structure.

Examples of the cleaning blade having a single-layer structure include a cleaning blade the entirety of which (including the contact portion that comes into contact with a target member) is composed of a single material (i.e., a cleaning blade composed of a contact member).

Examples of the cleaning blade having a two-layer structure include a cleaning blade including a first layer composed of a contact member including the contact portion that comes into contact with a target member and a second layer disposed rearward of the first layer and composed of a material different from that constituting the contact member, the second layer serving as a backing layer.

Examples of the cleaning blade constituted by three or more layers include a cleaning blade that includes the first and second layers of the cleaning blade having a two-layer structure and another layer interposed between the first and second layers.

The cleaning blade is, for example, supported by a stiff, tabular support member.

Hardness

The hardness of the blade contact portion is 85° or more and 95° or less and is preferably 88° or more and 93° or less.

If the hardness of the blade contact portion is less than 85°, the blade may become curled up and the pass-through of toner particles may occur. This results in formation of colored streaks. Furthermore, abrasion resistance may become degraded.

If the hardness of the blade contact portion is more than 95°, the capability of the edge of the blade contact portion to follow the target member may become degraded and the cleaning ability may become degraded accordingly. This results in formation of colored streaks.

The hardness of the blade contact portion is determined in the following manner.

The measurement of hardness is conducted using a Type-A durometer specified in JIS K 7215 (1986) in accordance with the hardness testing method described in JIS K 6253 (1997). Specifically, an indenter is pressed against the contact portion using a Type-A durometer (produced by Kobunshi Keiki Co., Ltd.) specified in JIS K 7215 (1986), and the maximum value indicated by the pointer is read within 1 second. The above measurement is repeated 5 times, and the JIS-A hardness of the contact portion is determined on the basis of the average thereof.

Plastic Deformation Power

The plastic deformation power of the blade contact portion is 12% or less and is preferably 10% or less.

If the plastic deformation power of the blade contact portion is more than 12%, when the blade contact portion is locally drawn, it may fail to recover its original state and, consequently, pass-through of toner particles may occur. This results in formation of colored streaks.

The lower limit for the plastic deformation power of the blade contact portion is, for example, 5% or more in order to reduce blade noise.

The plastic deformation power of the blade contact portion is determined in the following manner.

An elastic deformation power is measured by nanoindentation using a nanoindenter ("PICODENTOR HM500" produced by Fischer Instruments K. K.) under the following conditions: test load: 0.5 mN, indenter type: 115° triangular pyramid indenter, Berkovich diamond indenter. A plastic deformation power is calculated using the following formula.

Plastic deformation power=100%−Elastic deformation power

Si Content

The Si content at the surface of the blade contact portion is 15 atm % or more, is preferably 18 atm % or more, and is more preferably 20 atm % or more.

If the Si content at the surface of the blade contact portion is less than 15 atm %, the coefficient of friction between the blade contact portion and the target member may be increased, the blade may become curled up, and the pass-through of toner particles may occur consequently. This results in formation of colored streaks.

The upper limit for the Si content at the surface of the blade contact portion is, for example, 25 atm % or less in order to reduce the formation of colored streaks.

When the Si content at the surface of the blade contact portion is defined as XA and the Si content at a depth of 50 nm below the surface of the blade contact portion is defined as XB, XB/XA is preferably 0.8 or more, is more preferably 0.85 or more, and is further preferably 0.9 or more.

When XB/XA is less than 0.8, even if the blade contact portion becomes worn, the coefficient of friction of the blade contact portion may be maintained at a low level and the formation of colored streaks may be readily reduced. In particular, the reduction in the formation of colored streaks may be readily maintained.

The upper limit for XB/XA is, for example, 0.95 or less in consideration of chipping of the blade.

The Si content at the surface of the blade contact portion is determined in the following manner.

A sample is taken from the blade contact portion. The surface of the sample is analyzed by X-ray photoelectron spectroscopy (XPS) under the conditions below. The Si content (atm %) relative to the total content (atm %) of all the elements is calculated on the basis of the peak intensities of N, C, O, F, and Si.

XPS device: "VersaProbe II" produced by ULVAC-PHI, Inc.
Etching gun: argon gun
Acceleration voltage: 5 kV
Emission current: 20 mA
Sputtering region: 2 mm×2 mm
Sputtering rate: 3 nm/min (in terms of $SiO_2$)

The Si content at a depth of 50 nm below the surface of the blade contact portion is determined in the following manner.

A sample is taken from the blade contact portion. The sample is etched by sputtering to a depth of 50 nm below the surface, and the etched surface is analyzed by X-ray photoelectron spectroscopy (XPS) under the above-described conditions. The Si content (atm %) relative to the total content (atm %) of all the elements is calculated on the basis of the peak intensities of N, C, O, F, and Si.

Structure of Blade Contact Portion

The blade contact portion includes a polyurethane.

The hardness and plastic deformation power of the blade contact portion are adjusted to fall within the above ranges by changing the proportions of the hard and soft segments of the polyurethane and the amount of the Si-containing compound added relative to the amount of polyurethane.

For adjusting the Si content at the surface of the blade contact portion and XB/XA to fall within the above ranges, the blade contact portion may include a Si-containing compound.

Polyurethane

The polyurethane is a polyurethane produced by the polymerization of at least a polyol component and a polyisocyanate component. The polyurethane may be a polyurethane produced by the polymerization of a polyol component, a polyisocyanate component, and as needed, a resin having a functional group reactive with the isocyanate group of a polyisocyanate.

The polyurethane preferably has hard and soft segments. Note that the terms "hard segment" and "soft segment" used herein refer to segments of a polyurethane material such that the material constituting the hard segment is relatively harder than that constituting the soft segment and the material constituting the soft segment is relatively softer than that constituting the hard segment.

Examples of the material constituting the hard segment (i.e., hard-segment material) include a low-molecular-weight part of the polyol components and a resin having a functional group reactive with the isocyanate group of a polyisocyanate. Examples of the material constituting the soft segment (i.e., soft-segment material) include a high-molecular-weight part of the polyol components.

The average particle size of aggregates of the hard segment is preferably 1 μm or more and 10 μm or less and is more preferably 1 μm or more and 5 μm or less.

When the average particle size of aggregates of the hard segment is 1 μm or more, it becomes easy to reduce the friction resistance of the surface of the contact member. This stabilizes the behavior of the blade and reduces the occurrence of local abrasion.

When the average particle size of aggregates of the hard segment is 10 μm or less, the occurrence of chipping may be readily reduced.

The average particle size of aggregates of the hard segment is determined in the following manner. An image is taken using a polarizing microscope "BX51-P" produced by Olympus Corporation at a 20× magnification. The image is transformed into a binary representation by an image processing. The particle sizes (i.e., equivalent circle diameters) of aggregates are measured at 5 positions for each cleaning blade (the particle sizes of 5 aggregates are measured at each position), and 20 cleaning blades are analyzed. That is, in total, 500 aggregates are analyzed to calculate the average particle size.

Note that the binarization of the image is performed using image processing software "OLYMPUS Stream essentials" produced by Olympus Corporation. The thresholds for hue, chroma, and brightness are adjusted such that the aggregates of the crystal portions and the hard segment appear black and the amorphous portions (corresponding to the soft segment) appear white.

Polyol Component

The polyol component includes a high-molecular-weight polyol and a low-molecular-weight polyol.

The high-molecular-weight polyol component is a polyol having a number-average molecular weight of 500 or more and preferably of 500 or more and 5,000 or less. Examples of the high-molecular-weight polyol component include the polyols known in the related art, such as a polyester polyol produced by the dehydration condensation of a low-molecular-weight polyol with a dibasic acid, a polycarbonate polyol produced by the reaction of a low-molecular-weight polyol with an alkyl carbonate, a polycaprolactone polyol, and a polyether polyol. Examples of commercial products of the high-molecular-weight polyol include PLACCEL 205 and PLACCEL 240 produced by Daicel Corporation.

Note that the above number-average molecular weights are values determined by gel permeation chromatography (GPC). The same applies hereinafter.

The above high-molecular-weight polyols may be used alone or in combination of two or more.

The polymerization ratio of the high-molecular-weight polyol component to all the polymerization components of the polyurethane may be 30 mol % or more and 50 mol % or less and is preferably 40 mol % or more and 50 mol % or less.

The low-molecular-weight polyol component is a polyol having a molecular weight (i.e., a number-average molecular weight) of less than 500. The low-molecular-weight polyol is a material that serves as a chain extender and a crosslinking agent.

Examples of the low-molecular-weight polyol component include 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,20-eicosanediol. Among the above low-molecular-weight polyol components, 1,4-butanediol may be used.

Examples of the low-molecular-weight polyol component also include the diols (difunctional), triols (trifunctional), and tetraols (tetrafunctional) that are known in the related art as chain extenders and crosslinking agents.

The above polyols may be used alone or in combination of two or more.

The polymerization ratio of the low-molecular-weight polyol component to all the polymerization components of the polyurethane may be more than 50 mol % and 75 mol % or less, is preferably 52 mol % or more and 75 mol % or less, is more preferably 55 mol % or more and 75 mol % or less, and is further preferably 55 mol % or more and 60 mol % or less.

Polyisocyanate Component

Examples of the polyisocyanate component include 4,4'-diphenylmethane diisocyanate (MDI), 2,6-toluene diisocyanate (TDI), 1,6-hexane diisocyanate (HDI), 1,5-naphthalene diisocyanate (NDI), and 3,3-dimethylbiphenyl-4,4'-diisocyanate (TODI).

Among these, 4,4'-diphenylmethane diisocyanate (MDI), 1,5-naphthalene diisocyanate (NDI), and hexamethylene diisocyanate (HDI) may be used as a polyisocyanate component.

The above polyisocyanate components may be used alone or in combination of two or more.

The polymerization ratio of the polyisocyanate component to all the polymerization components of the polyurethane may be 5 mol % or more and 25 mol % or less and is preferably 10 mol % or more and 20 mol % or less.

Resin Having Functional Group Reactive With Isocyanate Group

The resin having a functional group reactive with an isocyanate group (hereinafter, referred to as "functional group-containing resin") is desirably a flexible resin and is more desirably an aliphatic resin having a linear structure in consideration of flexibility. Specific examples of the functional group-containing resin include an acrylic resin including two or more hydroxyl groups, a polybutadiene resin including two or more hydroxyl groups, and an epoxy resin including two or more epoxy groups.

Examples of commercial products of the acrylic resin including two or more hydroxyl groups include "Actflow UMB-2005B, UMB-2005P, UMB-2005, and UME-2005" produced by Soken Chemical & Engineering Co., Ltd.

Examples of commercial products of the polybutadiene resin including two or more hydroxyl groups include "R-45HT" produced by The Idemitsu Kosan Company, Ltd.

The epoxy resin including two or more epoxy groups may have higher flexibility and stiffness than the epoxy resins known in the related art, unlike the common epoxy resins which are hard and brittle. Examples of such an epoxy resin which are suitable in terms of molecular structure include epoxy resins having a backbone structure including a skeleton capable of enhancing the mobility of the backbone (i.e., a flexible skeleton). Examples of the flexible skeleton include an alkylene skeleton, a cycloalkane skeleton, and a polyoxyalkylene skeleton. Among these, a polyoxyalkylene skeleton is particularly suitable.

An epoxy resin suitable in terms of physical properties is an epoxy resin having a low viscosity relative to the molecular weight thereof, compared with the epoxy resins known in the related art. Specifically, it is desirable that the weight-average molecular weight of the epoxy resin fall within a range of 900±100 and the viscosity of the epoxy resin at 25° C. fall within a range of 15,000±5,000 mPa·s. It is more desirable that the viscosity of the epoxy resin at 25° C. fall within a range of 15,000±3,000 mPa·s. Examples of commercial products of the epoxy resin having the above-described properties include EPICLON EXA-4850-150 produced by DIC Corporation.

The polymerization ratio of the functional group-containing resin may be set such that the properties of the cleaning blade are not impaired.

Method for Producing Polyurethane

For producing the polyurethane, common methods for producing polyurethanes, such as a prepolymer method and a one-shot method, may be used. Although a prepolymer method, with which a polyurethane excellent in terms of abrasion resistance and chipping resistance can be produced, is suitable for this exemplary embodiment, the production method is not limited.

The cleaning blade is prepared by forming a cleaning blade-forming composition prepared by the above-described method into a sheet-like shape using a centrifugal process, extrusion molding, or the like and subjecting the sheet-like body to a cut process or the like.

Examples of catalysts used for producing the polyurethane include amine compounds, such as a tertiary amine; quaternary ammonium salts, and organometallic compounds, such as an organic tin compound.

Examples of the tertiary amine include trialkylamines, such as triethylamine; tetraalkyldiamines, such as N,N,N',N'-tetramethyl-1,3-butanediamine; aminoalcohols, such as dimethylethanolamine; ester amines, such as ethoxylated amine, ethoxylated diamine, and bis(diethylethanolamine) adipate; cyclohexylamine derivatives, such as triethylenediamine (TEDA) and N,N-dimethylcyclohexylamine; morpholine derivatives, such as N-methylmorpholine and N-(2-hydroxypropyl)-dimethylmorpholine; and piperazine derivatives, such as N,N'-diethyl-2-methylpiperazine and N,N'-bis-(2-hydroxypropyl)-2-methylpiperazine.

Examples of the quaternary ammonium salts include an octylic acid salt of 2-hydroxypropyltrimethylammonium, an octylic acid salt of 1,5-diazabicyclo[4.3.0]nonene-5 (DBN), an octylic acid salt of 1,8-diazabicyclo[5.4.0]undecene-7 (DBU), an oleic acid salt of DBU, a p-toluenesulfonic acid salt of DBU, a formic acid salt of DBU, and a formic acid salt of 2-hydroxypropyltrimethylammonium.

Examples of the organic tin compound include dialkyltin compounds, such as dibutyltin dilaurate and dibutyltin di(2-ethylhexoate); and tin (II) 2-ethylcaproate and tin (II) oleate.

Among the above catalysts, triethylenediamine (TEDA), which is a tertiary ammonium salt, is used in consideration of hydrolysis resistance, and a quaternary ammonium salt may be used in terms of workability. Among the quaternary ammonium salts, an octylic acid salt of 1,5-diazabicyclo[4.3.0]nonene-5 (DBN), an octylic acid salt of 1,8-diazabicyclo[5.4.0]undecene-7 (DBU), and a formic acid salt of DBU, which have high reaction activity, may be used.

The content of the catalyst is preferably 0.0005% by mass or more and 0.03% by mass or less and is particularly preferably 0.001% by mass or more and 0.01% by mass or less of the total amount of polyurethane constituting the contact member.

The above catalysts may be used alone or in combination of two or more.

Si-Containing Compound

Examples of the Si-containing compound include silica particles.

The silica particles may be any particles composed primarily of silica, that is, $SiO_2$, and may be either crystalline or amorphous.

The silica particles may be particles produced using a silicon compound, such as water glass or alkoxysilane, as a raw material or particles produced by pulverizing quartz. Specific examples of the silica particles include sol-gel silica particles; aqueous colloidal silica particles; alcoholic silica particles; fumed silica particles produced by a gas-phase method or the like; and fused silica particles.

The average primary particle diameter of the silica particles is preferably 100 nm or more and 500 nm or less and is more preferably 200 nm or more and 350 nm or less in order to further reduce the coefficient of friction of the blade contact portion.

The average primary particle diameter of the silica particles is determined in the following manner. Note that the size of a silica particle is the diameter of a circle having the same area as the image of the primary particle (i.e., "equivalent circle diameter").

The silica particles are observed with a scanning electron microscope (SEM), and an electron microscope image is taken. Using the electron microscope image, the equivalent circle diameter of a silica particle is calculated by image analysis. The above operation is done for 100 silica particles. In a number-basis distribution of primary particle diameters of the silica particles, the particle size (i.e., 50% diameter, D50v) at which the cumulative value calculated in order of increasing diameters reaches 50% is defined as the average primary particle size of the silica particles.

A silicone polymer may be used as a Si-containing compound, in addition to the silica particles.

The content of the Si-containing compound is preferably 10% by mass or more and 35% by mass or less and is more preferably 15% by mass or more and 25% by mass or less of the amount of polyurethane in order to further reduce the coefficient of friction of the blade contact portion.

Pressing Force of Cleaning Blade

The cleaning blade is preferably arranged to come into contact with a target member at a pressing force of 1.5 gf/mm or more and 4.5 gf/mm or less. The above pressing force is more preferably 2.0 gf/mm or more and 3.5 gf/mm or less.

When the pressing force NF is 1.5 gf/mm or more, the likelihood of colored streaks being formed as a result of faulty cleaning may be readily reduced.

When the pressing force NF is 4.5 gf/mm or less, the occurrence of toner filming on the surface of a target member (i.e., the phenomenon in which toner particles are crushed and adhere onto the surface of a target member while being stretched) may be reduced.

Figure 2:
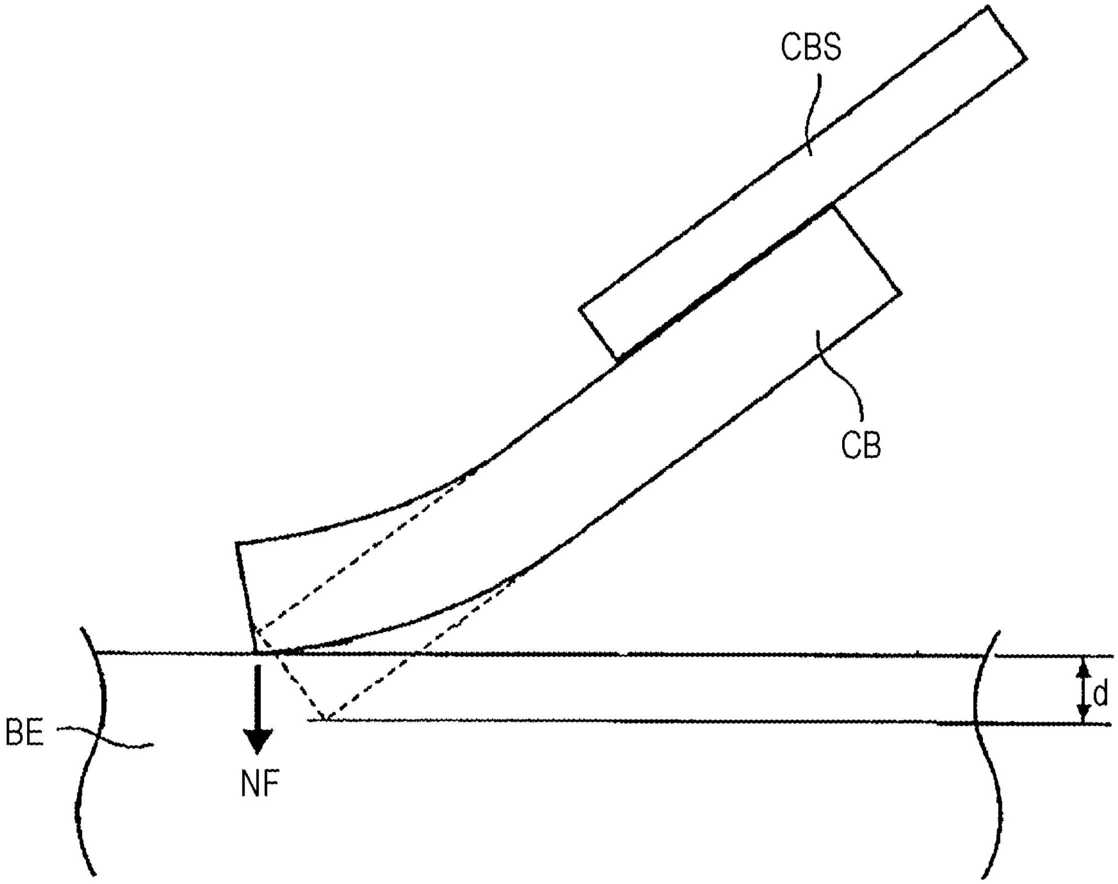
FIG. 2 is a schematic diagram used for describing the amount d of penetration of a cleaning blade into a member that is to be cleaned.

The pressing force NF of the cleaning blade can be calculated using the formula below.

$$\text{Pressing force } NF = k \times d$$

wherein k represents the specific spring constant of the cleaning blade, and d represents the amount of penetration of the cleaning blade into the intermediate transfer belt (see FIG. 2).

The specific spring constant k of the cleaning blade is determined by applying a displacement to the cleaning blade and measuring the load with a load cell.

The amount d of penetration of the cleaning blade into the intermediate transfer belt is determined by fixing the cleaning blade to a support member, bringing the intermediate transfer belt into contact with the cleaning blade, and subsequently measuring the amount of displacement of the cleaning blade.

In FIG. 2, BE denotes a target member, CB denotes a cleaning blade, and CBS denotes a support member that supports the cleaning blade.

The amount d of penetration of the cleaning blade into the target member is preferably 0 mm or more and 10 mm or less and is more preferably 0.01 mm or more and 5 mm or less.

Electrostatic Image Developer

The electrostatic image developer includes a toner.

The electrostatic image developer may be a single-component developer including only the toner or a two-component developer that is a mixture of the toner and a carrier.

Toner

The toner includes toner particles.

The toner particles include, for example, a binder resin and a release agent. The toner particles may optionally include another internal additive, such as a colorant.

The amount of the release agent present in a region that extends 800 nm below the surfaces of the toner particles is 70% or more of the total amount of the release agent included in the toner particles, and the release agent has a melting temperature of 65° C. or more and 80° C. or less.

Release Agent

The melting temperature of the release agent is 65° C. or more and 80° C. or less, is preferably 68° C. or more and 77° C. or less, and is more preferably 70° C. or more and 75° C. or less. When the melting temperature of the release agent is 80° C. or less, the low-temperature fixability of images may be enhanced. When the melting temperature of the release agent is 65° C. or more, the occurrence of toner filming on the surface of the target member may be reduced.

The melting temperature of the release agent is determined from the "melting peak temperature" according to a method for determining melting temperature which is described in JIS K 7121:1987 "Testing Methods for Transition Temperatures of Plastics" using a differential scanning calorimetry (DSC) curve obtained by DSC.

In a region that extends 800 nm below the surfaces of the toner particles, 70% or more of the total amount of the release agent is present. Hereinafter, the proportion of the release agent present in a region that extends 800 nm below the surfaces of the toner particles is referred to also as "surface-layer proportion of the release agent".

The surface-layer proportion of the release agent is 70% or more, is preferably 75% or more, and is more preferably 80% or more. The upper limit for the surface-layer proportion of the release agent may be 100%. Since the surface-layer proportion of the release agent is 70% or more, the low-temperature fixability of images may be enhanced.

The method for determining the surface-layer proportion of the release agent is described below.

Samples and images for the measurement are prepared by the following method.

The toner is mixed with an epoxy resin so as to be buried in the epoxy resin. The epoxy resin is then solidified. The resulting solid is cut with an ultramicrotome apparatus "Ultracut UCT" produced by Leica Biosystems into a thin specimen having a thickness of 80 nm or more and 130 nm or less. A SEM observation image of the thin specimen is taken with an ultra-high-resolution field-emission scanning electron microscope (FE-SEM) "S-4800" produced by Hitachi High-Tech Corporation. In the SEM image, the cross section of a toner particle the maximum length of which is 85% or more of the volume-average particle size of the toner particles is selected, and the release agent domain is observed. Then, the area of the release agent included in the entire toner particle and the area of the release agent present in a region that extends 800 nm below the surface of the toner particle are measured. The ratio of the two areas (i.e., Area of release agent present in region that extends 800 nm below surface of toner particle/Area of release agent included in entire toner particle) is calculated. The above calculation is done for 100 toner particles, and the average thereof is considered the surface-layer proportion of the release agent.

The reasons for which the cross section of a toner particle the maximum length of which is 85% or more of the volume-average particle size of the toner particles is selected are that a cross section of a toner particle the maximum length of which is less than 85% of the volume-average particle size is considered a cross section of the edge of the toner particle and that the cross section of the edge of the toner particle does not reflect the state of the domains included in the toner particle adequately.

For adjusting the surface-layer proportion of the release agent to 70% or more, for example, toner particles having a core-shell structure may be produced while a release agent is used in the formation of the shell.

Examples of the release agent include, but are not limited to, hydrocarbon waxes, such as a paraffin wax; natural waxes, such as a carnauba wax, a rice bran wax, and a candelilla wax; synthetic or mineral-petroleum-derived waxes, such as a montan wax; and ester waxes, such as a fatty-acid ester wax and a montanate wax.

For example, a hydrocarbon wax may be used as a release agent. The hydrocarbon wax is a wax having a hydrocarbon skeleton. Examples of the hydrocarbon wax include a Fischer-Tropsch wax, a polyethylene wax (i.e., a wax having a polyethylene skeleton), a polypropylene wax (i.e., a wax having a polypropylene skeleton), a paraffin wax (i.e., a wax having a paraffin skeleton), and a microcrystalline wax. Among these hydrocarbon waxes, a Fischer-Tropsch wax, a polyethylene wax, or a polypropylene wax may be used in consideration of fixability. It is preferable that the toner particles include a plural types of hydrocarbon waxes in consideration of fixability.

The proportion of the hydrocarbon wax to all the release agents may be 85% by mass or more, is preferably 95% by mass or more, and is more preferably 100% by mass.

The content of the release agent is, for example, preferably 1% by mass or more and 20% by mass or less, is more preferably 3% by mass or more and 20% by mass or less, is further preferably 3% by mass or more and 15% by mass or less, and is particularly preferably 5% by mass or more and 15% by mass or less of the total amount of the toner particles.

Binder Resin

Examples of the binder resin include vinyl resins; non-vinyl resins, such as an epoxy resin, a polyester resin, a polyurethane resin, a polyamide resin, a cellulose resin, a polyether resin, and a modified rosin; a mixture of the vinyl resin and the non-vinyl resin; and a graft polymer produced by polymerization of the vinyl monomer in the presence of the non-vinyl resin.

For example, a polyester resin may be used as a binder resin. The proportion of the polyester resin to all the binder resins may be, for example, 75% by mass or more, is preferably 90% by mass or more, and is more preferably 100% by mass.

Examples of the polyester resin include the amorphous polyester resins known in the related art. As a polyester resin, an amorphous polyester resin may be used in combination with a crystalline polyester resin. In such a case, the content of the crystalline polyester resin may be 2% by mass or more and 40% by mass or less and is preferably 2% by mass or more and 20% by mass or less of the total amount of all the binder resins.

The term "crystalline" used herein for resins refers to a property of exhibiting a distinct endothermic peak instead of a step-like endothermic change in DSC, that is, specifically, a property of exhibiting an endothermic peak with a half-width of 10° C. or less at a heating rate of 10° C./min.

The term "amorphous" used herein for resins refers to a property of having a half-width of more than 10° C., a property of exhibiting a step-like endothermic change, or a property of not exhibiting a distinct endothermic peak.

Amorphous Polyester Resin

Examples of the amorphous polyester resin include condensation polymers of a polyvalent carboxylic acid and a polyhydric alcohol. The amorphous polyester resin may be a commercially available one or a synthesized one.

Examples of the polyvalent carboxylic acid include aliphatic dicarboxylic acids, such as oxalic acid, malonic acid, maleic acid, fumaric acid, citraconic acid, itaconic acid, glutaconic acid, succinic acid, alkenyl succinic acid, adipic acid, and sebacic acid; alicyclic dicarboxylic acids, such as cyclohexanedicarboxylic acid; aromatic dicarboxylic acids, such as terephthalic acid, isophthalic acid, orthophthalic acid, and naphthalenedicarboxylic acid; anhydrides of these dicarboxylic acids; and lower (e.g., 1 to 5 carbon atoms) alkyl esters of these dicarboxylic acids. Among these polyvalent carboxylic acids, aromatic dicarboxylic acids may be used.

Trivalent or higher carboxylic acids having a crosslinked structure or a branched structure may be used as a polyvalent carboxylic acid in combination with the dicarboxylic acids. Examples of the trivalent or higher carboxylic acids include trimellitic acid, pyromellitic acid, anhydrides of these carboxylic acids, and lower (e.g., 1 to 5 carbon atoms) alkyl esters of these carboxylic acids.

The above polyvalent carboxylic acids may be used alone or in combination of two or more.

Examples of the polyhydric alcohol include aliphatic diols, such as ethylene glycol, diethylene glycol, triethylene glycol, propylene glycol, butanediol, hexanediol, and neopentyl glycol; alicyclic diols, such as cyclohexanediol, cyclohexanedimethanol, and hydrogenated bisphenol A; and aromatic diols, such as bisphenol A-ethylene oxide adduct and bisphenol A-propylene oxide adduct. Among these polyhydric alcohols, for example, aromatic diols and alicyclic diols may be used. In particular, aromatic diols may be used.

Trihydric or higher alcohols having a crosslinked structure or a branched structure may be used as a polyhydric alcohol in combination with the diols. Examples of the trihydric or higher alcohols include glycerin, trimethylolpropane, and pentaerythritol.

The above polyhydric alcohols may be used alone or in combination of two or more.

The glass transition temperature Tg of the amorphous polyester resin is preferably 50° C. or more and 80° C. or less and is more preferably 50° C. or more and 65° C. or less.

The glass transition temperature of a resin is determined from a differential scanning calorimetry (DSC) curve obtained by DSC. More specifically, the glass transition temperature of a resin is determined from the "extrapolated glass-transition-starting temperature" according to a method for determining glass transition temperature which is described in JIS K 7121:1987 "Testing Methods for Transition Temperatures of Plastics".

The weight average molecular weight Mw of the amorphous polyester resin is preferably 5,000 or more and 1,000,000 or less and is more preferably 7,000 or more and 500,000 or less.

The number average molecular weight Mn of the amorphous polyester resin may be 2,000 or more and 100,000 or less.

The molecular weight distribution index Mw/Mn of the amorphous polyester resin is preferably 1.5 or more and 100 or less and is more preferably 2 or more and 60 or less.

The weight average molecular weight and number average molecular weight of a resin are determined by gel permeation chromatography (GPC). Specifically, the molecular weights of a resin are determined by GPC using a "HLC-8120GPC" produced by Tosoh Corporation as measuring equipment, a column "TSKgel SuperHM-M (15 cm)" produced by Tosoh Corporation, and a THF solvent. The weight average molecular weight and number average molecular weight of the resin are determined on the basis of the results of the measurement using a molecular-weight calibration curve based on monodisperse polystyrene standard samples.

The amorphous polyester resin may be produced by any suitable production method known in the related art. Specifically, the amorphous polyester resin may be produced by, for example, a method in which polymerization is performed at 180° C. or more and 230° C. or less, the pressure inside the reaction system is reduced as needed, and water and alcohols that are generated by condensation are removed.

In the case where the raw materials, that is, the monomers, are not dissolved in or miscible with each other at the reaction temperature, a solvent having a high boiling point may be used as a dissolution adjuvant in order to dissolve the raw materials. In such a case, the condensation polymerization reaction is performed while the dissolution adjuvant is distilled away. In the case where a monomer having low miscibility is present in the copolymerization reaction, a condensation reaction of the monomers with an acid or alcohol that is to undergo a polycondensation reaction with the monomers may be performed in advance and subsequently polycondensation of the resulting polymers with the other components may be performed.

Crystalline Polyester Resin

Examples of the crystalline polyester resin include condensation polymers of a polyvalent carboxylic acid and a polyhydric alcohol. The crystalline polyester resin may be commercially available one or a synthesized one.

In order to increase case of forming a crystal structure, a condensation polymer prepared from linear aliphatic polymerizable monomers may be used as a crystalline polyester resin instead of a condensation polymer prepared from polymerizable monomers having an aromatic ring.

Examples of the polyvalent carboxylic acid include aliphatic dicarboxylic acids, such as oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid; aromatic dicarboxylic acids, such as dibasic acids (e.g., phthalic acid, isophthalic acid, terephthalic acid, and naphthalene-2,6-dicarboxylic acid); anhydrides of these dicarboxylic acids; and lower (e.g., 1 to 5 carbon atoms) alkyl esters of these dicarboxylic acids.

Trivalent or higher carboxylic acids having a crosslinked structure or a branched structure may be used as a polyvalent carboxylic acid in combination with the dicarboxylic acids. Examples of the trivalent carboxylic acids include aromatic carboxylic acids, such as 1,2,3-benzenetricarboxylic acid, 1,2,4-benzenetricarboxylic acid, and 1,2,4-naphthalenetricarboxylic acid; anhydrides of these tricarboxylic acids; and lower (e.g., 1 to 5 carbon atoms) alkyl esters of these tricarboxylic acids.

Dicarboxylic acids including a sulfonic group and dicarboxylic acids including an ethylenic double bond may be used as a polyvalent carboxylic acid in combination with the above dicarboxylic acids.

The above polyvalent carboxylic acids may be used alone or in combination of two or more.

Examples of the polyhydric alcohol include aliphatic diols, such as linear aliphatic diols including a backbone having 7 to 20 carbon atoms. Examples of the aliphatic diols include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosanedecanediol. Among these aliphatic diols, 1,8-octanediol, 1,9-nonanediol, and 1,10-decanediol may be used.

Trihydric or higher alcohols having a crosslinked structure or a branched structure may be used as a polyhydric alcohol in combination with the above diols. Examples of the trihydric or higher alcohols include glycerin, trimethylolethane, trimethylolpropane, and pentaerythritol.

The above polyhydric alcohols may be used alone or in combination of two or more.

The content of the aliphatic diols in the polyhydric alcohol may be 80 mol % or more and is preferably 90 mol % or more.

The melting temperature of the crystalline polyester resin is preferably 50° C. or more and 100° C. or less, is more preferably 55° C. or more and 90° C. or less, and is further preferably 60° C. or more and 85° C. or less.

The above melting temperature is determined from the "melting peak temperature" according to a method for determining melting temperature which is described in JIS K 7121:1987 "Testing Methods for Transition Temperatures of Plastics" using a differential scanning calorimetry (DSC) curve obtained by DSC.

The weight-average molecular weight Mw of the crystalline polyester resin may be 6,000 or more and 35,000 or less.

The crystalline polyester resin may be produced by a production method known in the related art as in, for example, the preparation of the amorphous polyester above.

As a binder resin, another binder resin may be used in combination with the polyester resin. Examples of the other binder resin include a styrene (meth)acrylic resin.

The styrene (meth)acrylic resin is a copolymer produced by copolymerization of at least a monomer having a styrene skeleton and a monomer having a (meth)acryloyl group. The term "(meth)acrylic acid" used herein refers to both "acrylic acid" and "methacrylic acid". The term "(meth)acryloyl group" used herein refers to both "acryloyl group" and "methacryloyl group".

Examples of the monomer having a styrene skeleton (hereinafter, referred to as "styrene-based monomer") include styrene, alkyl-substituted styrenes (e.g., α-methylstyrene, 2-methylstyrene, 3-methylstyrene, 4-methylstyrene, 2-ethylstyrene, 3-ethylstyrene, and 4-ethylstyrene), halogen-substituted styrenes (e.g., 2-chlorostyrene, 3-chlorostyrene, and 4-chlorostyrene), and vinylnaphthalene. These styrene-based monomers may be used alone or in combination of two or more.

Among these styrene-based monomers, styrene may be used from the viewpoints of reactivity, case of controlling a reaction, and availability.

Examples of the monomer having a (meth)acryloyl group (hereinafter, referred to as "(meth)acrylic acid-based monomer") include (meth)acrylic acid and (meth)acrylic acid esters. Examples of the (meth)acrylic acid esters include (meth)acrylic acid alkyl esters (e.g., n-methyl (meth)acrylate, n-ethyl (meth)acrylate, n-propyl (meth)acrylate, n-butyl (meth)acrylate, n-pentyl (meth)acrylate, n-hexyl acrylate, n-heptyl (meth)acrylate, n-octyl (meth)acrylate, n-decyl (meth)acrylate, n-dodecyl (meth)acrylate, n-lauryl (meth)acrylate, n-tetradecyl (meth)acrylate, n-hexadecyl (meth)acrylate, n-octadecyl (meth)acrylate, isopropyl (meth)acrylate, isobutyl (meth)acrylate, t-butyl (meth)acrylate, isopentyl (meth)acrylate, amyl (meth)acrylate, neopentyl (meth)acrylate, isohexyl (meth)acrylate, isoheptyl (meth) acrylate, isooctyl (meth)acrylate, 2-ethylhexyl (meth) acrylate, cyclohexyl (meth)acrylate, and t-butylcyclohexyl (meth)acrylate); (meth)acrylic acid aryl esters (e.g., phenyl (meth)acrylate, biphenyl (meth)acrylate, diphenylethyl (meth)acrylate, t-butylphenyl (meth)acrylate, and terphenyl (meth)acrylate); dimethylaminoethyl (meth)acrylate; diethylaminoethyl (meth)acrylate; methoxyethyl (meth)acrylate; 2-hydroxyethyl (meth)acrylate; β-carboxyethyl (meth)acrylate; and (meth)acrylamide. These (meth)acrylic acid-based monomers may be used alone or in combination of two or more.

The ratio of the styrene-based monomer to the (meth) acrylic acid-based monomer in copolymerization (i.e., styrene-based monomer/(meth)acrylic acid-based monomer, on a mass basis) may be, for example, 85/15 to 70/30.

The styrene (meth)acrylic resin may have a crosslinked structure in order to reduce image offset. An example of a styrene (meth)acrylic resin having a crosslinked structure is a crosslinked product produced by copolymerization of at least the monomer having a styrene skeleton, the monomer having a (meth)acrylic acid skeleton, and a crosslinkable monomer.

Examples of the crosslinkable monomer include difunctional or polyfunctional crosslinking agents.

Examples of the difunctional crosslinking agents include divinylbenzene, divinylnaphthalene, di(meth)acrylate compounds (e.g., diethylene glycol di(meth)acrylate, methylene-bis(meth)acrylamide, decanediol diacrylate, and glycidyl (meth)acrylate), polyester-type di(meth)acrylate, and methacrylic acid-2-([1'-methylpropylideneamino]carboxyamino) ethyl.

Examples of the polyfunctional crosslinking agents include tri(meth)acrylate compounds (e.g., pentaerythritol tri(meth)acrylate, trimethylolethane tri(meth)acrylate, and trimethylolpropane tri(meth)acrylate), tetra(meth)acrylate compounds (e.g., tetramethylolmethane tetra(meth)acrylate and oligoester (meth)acrylate), 2,2-bis(4-methacryloxy polyethoxyphenyl) propane, diallyl phthalate, triallyl cyanurate, triallyl isocyanurate, triallyl trimellitate, and diallyl chlorendate.

The ratio of the crosslinkable monomer to the all monomers in copolymerization (i.e., crosslinkable monomer/all monomers, on a mass basis) may be, for example, 2/1,000 to 30/1,000.

The weight-average molecular weight of the styrene (meth)acrylic resin is, for example, 30,000 or more and 200,000 or less, is preferably 40,000 or more and 100,000 or less, and is more preferably 50,000 or more and 80,000 or less in order to reduce image offset.

The weight-average molecular weight of the styrene (meth)acrylic resin is determined by the same method as that used for determining the weight-average molecular weight of the polyester resin.

The content of the styrene (meth)acrylic resin is, for example, 10% by mass or more and 30% by mass or less, is preferably 12% by mass or more and 28% by mass or less, and is more preferably 15% by mass or more and 25% by mass or less of the amount of the toner particles in order to enhance the flowability of the toner, increase case of storage of the toner, and reduce image offset.

Another binder resin may be further used in combination with the above binder resin.

Examples of the other binder resin include vinyl resins that are homopolymers of the following monomers or copolymers of two or more monomers selected from the following monomers: styrenes, such as styrene, para-chlorostyrene, and α-methylstyrene; (meth)acrylates, such as methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate; ethylenically unsaturated nitriles, such as acrylonitrile and methacrylonitrile; vinyl ethers, such as vinyl methyl ether and vinyl isobutyl ether; vinyl ketones, such as vinyl methyl ketone, vinyl ethyl ketone, and vinyl isopropenyl ketone; and olefins, such as ethylene, propylene, and butadiene.

Examples of the other binder resin further include non-vinyl resins, such as epoxy resins, polyester resins, polyurethanes, polyamide resins, cellulose resins, polyether resins, and modified rosins; a mixture of the non-vinyl resin and the vinyl resin; and a graft polymer produced by polymerization of the vinyl monomer in the presence of the non-vinyl resin.

The other binder resins above may be used alone or in combination of two or more.

The content of the binder resin is, for example, preferably 40% by mass or more and 95% by mass or less, is more preferably 50% by mass or more and 90% by mass or less, and is further preferably 60% by mass or more and 85% by mass or less of the total amount of the toner particles.

Colorant

Examples of the colorant include pigments, such as Carbon Black, Chrome Yellow, Hansa Yellow, Benzidine Yellow, Threne Yellow, Quinoline Yellow, Pigment Yellow, Permanent Orange GTR, Pyrazolone Orange, Vulcan Orange, Watching Red, Permanent Red, Brilliant Carmine 3B, Brilliant Carmine 6B, DuPont Oil Red, Pyrazolone Red, Lithol Red, Rhodamine B Lake, Lake Red C, Pigment Red, Rose Bengal, Aniline Blue, Ultramarine Blue, Calco Oil Blue, Methylene Blue Chloride, Phthalocyanine Blue, Pigment Blue, Phthalocyanine Green, and Malachite Green Oxalate; and dyes, such as acridine dyes, xanthene dyes, azo dyes, benzoquinone dyes, azine dyes, anthraquinone dyes, thioindigo dyes, dioxazine dyes, thiazine dyes, azomethine dyes, indigo dyes, phthalocyanine dyes, aniline black dyes, polymethine dyes, triphenylmethane dyes, diphenylmethane dyes, and thiazole dyes.

The above colorants may be used alone or in combination of two or more.

The colorant may optionally be subjected to a surface treatment and may be used in combination with a dispersant. Plural types of colorants may be used in combination.

For example, the content of the colorant in the entire toner particles is preferably 1% by mass or more and 30% by mass or less and is more preferably 3% by mass or more and 15% by mass or less.

Other Additives

Examples of the other additives included in the toner include additives known in the related art, such as a magnetic substance, a charge-controlling agent, and an inorganic powder. These additives may be added to the toner particles as internal additives.

Properties of Toner Particles

The toner particles may be toner particles having a single-layer structure. The toner particles may also be toner particles having a "core-shell" structure constituted by a core (i.e., core particle) and a coating layer (i.e., shell layer) covering the core. Among these, a core-shell structure may be used. The toner particles having a core-shell structure may be constituted by, for example, a core including a binder resin and a colorant and a coating layer including a binder resin and a release agent.

The volume average diameter D50v of the toner particles is preferably 2 μm or more and 10 μm or less and is more preferably 4 μm or more and 8 μm or less.

The various average particle sizes and various particle size distribution indices of the toner particles are measured using "COULTER MULTISIZER II" produced by Beckman Coulter, Inc. with an electrolyte "ISOTON-II" produced by Beckman Coulter, Inc. in the following manner.

A sample to be measured (0.5 mg or more and 50 mg or less) is added to 2 ml of a 5-mass % aqueous solution of a surfactant (e.g., sodium alkylbenzene sulfonate) that serves as a dispersant. The resulting mixture is added to 100 ml or more and 150 ml or less of an electrolyte.

The resulting electrolyte containing the sample suspended therein is subjected to a dispersion treatment for 1 minute using an ultrasonic disperser, and the distribution of the diameters of particles having a diameter of 2 μm or more and 60 μm or less is measured using COULTER MULTISIZER II with an aperture having a diameter of 100 μm. The number of the particles sampled is 50,000.

The particle diameter distribution measured is divided into a number of particle diameter ranges (i.e., channels). For each range, in ascending order in terms of particle diameter, the cumulative volume and the cumulative number are calculated and plotted to draw cumulative distribution curves. Particle diameters at which the cumulative volume and the cumulative number reach 16% are considered to be the volume particle diameter D16v and the number particle diameter D16p, respectively. Particle diameters at which the cumulative volume and the cumulative number reach 50% are considered to be the volume average particle diameter D50v and the number average particle diameter D50p, respectively. Particle diameters at which the cumulative volume and the cumulative number reach 84% are considered to be the volume particle diameter D84v and the number particle diameter D84p, respectively.

Using the volume particle diameters and number particle diameters measured, the volume particle size distribution index (GSDv) is calculated as $(D84v/D16v)^{1/2}$ and the number particle size distribution index (GSDp) is calculated as $(D84p/D16p)^{1/2}$.

The shape factor SF1 of the toner particles is preferably 110 or more and 150 or less and is more preferably 120 or more and 140 or less.

The shape factor SF1 of a toner particle is determined using the following formula:

$$SF1=(ML^2/A)\times(\pi/4)\times 100$$

where ML represents the absolute maximum length of a toner particle and A represents the projected area of the toner particle.

Specifically, the shape factor SF1 of the toner particles is determined by analyzing a microscope image or scanning electron microscope image of the toner particles using an image processor in the following manner. An optical microscope image of toner particles spread over the surface of a glass slide is loaded into a LUZEX image processor using a video camera. The maximum lengths and projected areas of 100 toner particles are measured. The shape factors SF1 of the 100 toner particles are calculated using the above formula, and the average thereof is calculated.

External Additive

The toner may include an external additive in addition to the toner particles.

Examples of the external additive include inorganic particles. Examples of the inorganic particles include $SiO_2$ particles, $TiO_2$ particles, $Al_2O_3$ particles, $SrTiO_3$ particles, CuO particles, ZnO particles, $SnO_2$ particles, $CeO_2$ particles, $Fe_2O_3$ particles, MgO particles, BaO particles, CaO particles, $K_2O$ particles, $Na_2O$ particles, $ZrO_2$ particles, $CaO\cdot SiO_2$ particles, $K_2O.\ (TiO_2)_n$ particles, $Al_2O_3\cdot 2SiO_2$ particles, $CaCO_3$ particles, $MgCO_3$ particles, $BaSO_4$ particles, and $MgSO_4$ particles.

The surfaces of the inorganic particles used as an external additive may be subjected to a hydrophobic treatment. The hydrophobic treatment is performed by, for example, immersing the inorganic particles in a hydrophobizing agent. Examples of the hydrophobizing agent include, but are not limited to, a silane coupling agent, a silicone oil, a titanate coupling agent, and aluminum coupling agent. These hydrophobizing agents may be used alone or in combination of two or more.

The amount of the hydrophobizing agent is, for example, 1 part by mass or more and 10 parts by mass or less relative to 100 parts by mass of the inorganic particles.

Examples of the external additive further include particles of a resin, such as polystyrene, polymethyl methacrylate (PMMA), or a melamine resin; and particles of a cleaning lubricant, such as a metal salt of a higher fatty acid, such as zinc stearate, or a fluorine-contained resin.

The amount of the external additive used is, for example, preferably 0.01% by mass or more and 5% by mass or less and is more preferably 0.01% by mass or more and 2.0% by mass or less of the amount of the toner particles.

Method for Producing Toner

The toner is produced by preparing the toner particles and, in the case where the toner includes an external additive, depositing an external additive onto the surfaces of the toner particles.

The toner particles may be prepared by any dry process, such as knead pulverization, or any wet process, such as aggregation coalescence, suspension polymerization, or dissolution suspension. However, a method for preparing the toner particles is not limited thereto, and any suitable method known in the related art may be used. Among these methods, aggregation coalescence may be used in order to prepare the toner particles.

Each of the steps of aggregation coalescence is described below in detail. It should be noted that, although a method for producing toner particles including a colorant is described below, the colorant is an optional component that may be used as needed. It is needless to say that an additive other than the colorant may be used.

Resin Particle Dispersion Liquid Preparation Step

First, a resin particle dispersion liquid in which particles of a resin that serves as a binder resin are dispersed, a colorant dispersion liquid in which colorant particles are dispersed, and a release agent particle dispersion liquid in which release agent particles are dispersed are prepared.

The resin particle dispersion liquid is prepared by, for example, dispersing resin particles in a dispersion medium using a surfactant.

Examples of the dispersion medium used for preparing the resin particle dispersion liquid include aqueous media.

Examples of the aqueous media include water, such as distilled water and ion-exchange water; and alcohols. These aqueous media may be used alone or in combination of two or more.

Examples of the surfactant include anionic surfactants, such as sulfate surfactants, sulfonate surfactants, and phosphate surfactants; cationic surfactants, such as amine salt surfactants and quaternary ammonium salt surfactants; and nonionic surfactants, such as polyethylene glycol surfactants, alkylphenol ethylene oxide adduct surfactants, and polyhydric alcohol surfactants. Among these surfactants, in particular, the anionic surfactants and the cationic surfactants may be used. The nonionic surfactants may be used in combination with the anionic surfactants and the cationic surfactants.

These surfactants may be used alone or in combination of two or more.

The resin particles can be dispersed in a dispersion medium by any suitable dispersion method commonly used in the related art in which, for example, a rotary-shearing homogenizer, a ball mill, a sand mill, or a dyno mill that includes media is used. Alternatively, the resin particles may be dispersed in the dispersion medium by phase-inversion emulsification. Phase-inversion emulsification is a method in which the resin that is to be dispersed is dissolved in a hydrophobic organic solvent in which the resin is soluble, a base is added to the resulting organic continuous phase (i.e., O phase) to perform neutralization, and subsequently water (i.e., W phase) is charged in order to perform phase inversion from W/O to O/W and disperse the resin in the aqueous medium in the form of particles.

The volume average size of the resin particles dispersed in the resin particle dispersion liquid is preferably, for example, 0.01 μm or more and 1 μm or less, is more preferably 0.08 μm or more and 0.8 μm or less, and is further preferably 0.1 μm or more and 0.6 μm or less.

The volume average size of the resin particles is determined in the following manner. The particle diameter distribution of the resin particles is obtained using a laser-diffraction particle-size-distribution measurement apparatus, such as "LA-700" produced by HORIBA, Ltd. The particle diameter distribution measured is divided into a number of particle diameter ranges (i.e., channels). For each range, in ascending order in terms of particle diameter, the cumulative volume is calculated and plotted to draw a cumulative distribution curve. A particle diameter at which the volume reaches 50% is considered to be the volume particle diameter D50v. The volume average sizes of particles included in the other dispersion liquids are also determined in the above-described manner. The content of the resin particles included in the resin particle dispersion liquid is preferably 5% by mass or more and 50% by mass or less and is more preferably 10% by mass or more and 40% by mass or less.

The colorant dispersion liquid and the release agent particle dispersion liquid are also prepared as in the preparation of the resin particle dispersion liquid. In other words, the above-described specifications for the dispersion medium of the resin particle dispersion liquid, the dispersion method used for preparing the resin particle dispersion liquid, the volume average diameter of the particles included in the resin particle dispersion liquid, and the content of the particles in the resin particle dispersion liquid can also be applied to the colorant dispersion liquid and the release agent particle dispersion liquid.

First Aggregated Particle Formation Step

The resin particle dispersion liquid is mixed with the colorant dispersion liquid.

In the resulting mixed dispersion liquid, heteroaggregation of the resin particles with the colorant particles is performed in order to form first aggregated particles including the resin particles and the colorant particles, the first aggregated particles having a diameter closer to that of the intended toner particles.

Alternatively, as needed, the release agent particle dispersion liquid may be mixed with the above mixed dispersion liquid in order to add the release agent particles to the first aggregated particles.

Specifically, for example, a coagulant is added to the mixed dispersion liquid, and the pH of the mixed dispersion liquid is controlled to be acidic (e.g., pH of 2 or more and 5 or less). A dispersion stabilizer may be added to the mixed dispersion liquid as needed. Subsequently, the mixed dispersion liquid is heated to a temperature close to the glass transition temperature of the resin (specifically, e.g., [Glass transition temperature of the resin−30° C.] or more and [the Glass transition temperature−10° C.] or less), and thereby the particles dispersed in the mixed dispersion liquid are caused to aggregate together to form first aggregated particles.

In the first aggregated particle formation step, alternatively, for example, the above coagulant may be added to the mixed dispersion liquid at room temperature (e.g., 25° C.) while the mixed dispersion liquid is stirred using a rotary-shearing homogenizer. Then, the pH of the mixed dispersion liquid is controlled to be acidic (e.g., pH of 2 or more and 5 or less), and a dispersion stabilizer may be added to the mixed dispersion liquid as needed. Subsequently, the mixed dispersion liquid is heated in the above-described manner.

Examples of the coagulant include surfactants that have a polarity opposite to that of the surfactant included in the mixed dispersion liquid, inorganic metal salts, and divalent or higher metal complexes. Using a metal complex as a coagulant reduces the amount of coagulant used and, as a result, charging characteristics may be enhanced.

An additive capable of forming a complex or a bond similar to a complex with the metal ions contained in the coagulant may optionally be used in combination with the coagulant. An example of the additive is a chelating agent.

Examples of the inorganic metal salts include metal salts, such as calcium chloride, calcium nitrate, barium chloride, magnesium chloride, zinc chloride, aluminum chloride, and aluminum sulfate; and inorganic metal salt polymers, such as polyaluminum chloride, polyaluminum hydroxide, and calcium polysulfide.

The chelating agent may be a water-soluble chelating agent. Examples of such a chelating agent include oxycarboxylic acids, such as tartaric acid, citric acid, and gluconic acid; and aminocarboxylic acids, such as iminodiacetic acid (IDA), nitrilotriacetic acid (NTA), and ethylenediaminetetraacetic acid (EDTA).

The amount of the chelating agent used is, for example, preferably 0.01 parts by mass or more and 5.0 parts by mass or less and is more preferably 0.1 parts by mass or more and less than 3.0 parts by mass relative to 100 parts by mass of the resin particles.

Second Aggregated Particle Formation Step

After the first aggregated particle dispersion liquid, in which the first aggregated particles are dispersed, has been prepared, the first aggregated particle dispersion liquid is further mixed with the resin particle dispersion liquid and the release agent particle dispersion liquid. Alternatively, a liquid mixture prepared by mixing the resin particle dispersion liquid with the release agent particle dispersion liquid may be mixed with the first aggregated particle dispersion liquid.

In a mixed dispersion liquid including the first aggregated particles, the resin particles, and the release agent particles dispersed therein, aggregation is performed such that the resin particles and the release agent particles are deposited on the surfaces of the first aggregated particles in order to form second aggregated particles.

Specifically, for example, when the size of the first aggregated particles reaches an intended particle size in the first aggregated particle formation step, the dispersion liquid including the resin particles and the release agent particles dispersed therein is mixed with the first aggregated particle dispersion liquid. Subsequently, the mixed dispersion liquid is heated to a temperature equal to or less than the glass transition temperature of the resin and the pH of the mixed dispersion liquid is adjusted to, for example, about 6.5 or more and 8.5 or less in order to stop the aggregation.

Hereby, second aggregated particles including the first aggregated particles and the resin particles and the release agent particles aggregated with the first aggregated particles so as to be deposited on the surfaces thereof are formed.

Fusion Coalescence Step

The second aggregated particle dispersion liquid in which the second aggregated particles are dispersed is heated to, for example, a temperature equal to or higher than the glass transition temperature of the resin (e.g., [Glass transition temperature of the resin+10° C.] or more and [the Glass transition temperature+50° C.] or less) in order to perform fusion and coalescence of the second aggregated particles and form toner particles.

The toner particles are produced through the above-described steps.

Alternatively, the toner particles may be produced by, subsequent to the preparation of the second aggregated particle dispersion liquid in which the second aggregated particles are dispersed, further mixing the second aggregated particle dispersion liquid with a resin particle dispersion liquid in which resin particles are dispersed to cause aggregation such that the resin particles are deposited on the surfaces of the second aggregated particles and form third aggregated particles; and heating the third aggregated particle dispersion liquid in which the third aggregated particles are dispersed to cause fusion and coalescence of the third aggregated particles and form toner particles.

After the completion of the fusion-coalescence step, the toner particles formed in the solution are subjected to any suitable cleaning step, solid-liquid separation step, and drying step that are known in the related art in order to obtain dried toner particles.

In the cleaning step, the toner particles may be subjected to displacement washing using ion-exchange water to a sufficient degree from the viewpoint of electrification characteristics. Examples of a solid-liquid separation method used in the solid-liquid separation step include, but are not limited to, suction filtration and pressure filtration from the viewpoint of productivity. Examples of a drying method used in the drying step include, but are not limited to, freeze-drying, flash drying, fluidized drying, and vibrating fluidized drying from the viewpoint of productivity.

The toner according to the exemplary embodiment is produced by, for example, adding an external additive to the dried toner particles and mixing the resulting toner particles using a V-blender, a HENSCHEL mixer, a Lodige mixer, or the like. Optionally, coarse toner particles may be removed using a vibrating screen classifier, a wind screen classifier, or the like.

Carrier

The type of the carrier is not limited, and any suitable carrier known in the related art may be used. Examples of the carrier include a coated carrier prepared by coating the surfaces of cores including magnetic powder particles with a coat resin; a magnetic-powder-dispersed carrier prepared by dispersing and mixing magnetic powder particles in a matrix resin; and a resin-impregnated carrier prepared by impregnating a porous magnetic powder with a resin.

The magnetic-powder-dispersed carrier and the resin-impregnated carrier may also be prepared by coating the surfaces of particles constituting the carrier, that is, core particles, with a coat resin.

Examples of the magnetic powder include powders of magnetic metals, such as iron, nickel, and cobalt; and powders of magnetic oxides, such as ferrite and magnetite.

Examples of the coat resin and the matrix resin include styrene (meth)acrylic resins; polyolefin resins, such as a polyethylene resin and a polypropylene resin; polyvinyl and polyvinylidene resins, such as polystyrene, a (meth)acrylic resin, polyacrylonitrile, polyvinyl acetate, polyvinyl alcohol, polyvinyl butyral, polyvinyl chloride, polyvinyl carbazole, polyvinyl ether, and polyvinyl ketone; vinyl chloride-vinyl acetate copolymers; straight silicone resins including an organosiloxane bond and the modified products thereof; fluorine resins, such as polytetrafluoroethylene, polyvinyl fluoride, polyvinylidene fluoride, and polychlorotrifluoroethylene; polyesters; polyurethanes; polycarbonates; amino resins, such as urea and formaldehyde resins; and epoxy resins.

It is preferable that the coat resin and the matrix resin include a (meth)acrylic resin. It is more preferable that the content of the (meth)acrylic resin be 50% by mass or more of the total mass of the resin. It is further preferable that the content of the (meth)acrylic resin be 80% by mass or more of the total mass of the resin.

It is particularly preferable that the coat resin and matrix resin include an alicyclic (meth)acrylic resin as a (meth) acrylic resin.

The coat resin and the matrix resin may optionally include additives, such as conductive particles.

Examples of the conductive particles include particles of metals, such as gold, silver, and copper; and particles of carbon black, titanium oxide, zinc oxide, tin oxide, barium sulfate, aluminum borate, and potassium titanate.

The surfaces of the cores can be coated with a coat resin by, for example, using a coating-layer forming solution prepared by dissolving the coat resin and, as needed, various types of additives in a suitable solvent. The type of the solvent is not limited and may be selected with consideration of the type of the coat resin used, case of applying the coating-layer forming solution, and the like.

Specific examples of a method for coating the surfaces of the cores with the coat resin include an immersion method in which the cores are immersed in the coating-layer forming solution; a spray method in which the coating-layer forming solution is sprayed onto the surfaces of the cores; a fluidized-bed method in which the coating-layer forming solution is sprayed onto the surfaces of the cores while the cores are floated using flowing air; and a kneader-coater method in which the cores of the carrier are mixed with the coating-layer forming solution in a kneader coater and subsequently the solvent is removed.

The mixing ratio (i.e., mass ratio) of the toner to the carrier in the two-component developer is preferably toner: carrier=1:100 to 30:100 and is more preferably 3:100 to 20:100. Intermediate Transfer-type Transfer Device First Transfer Device In the first transfer device, the first transfer member is arranged to face the image holding member across the intermediate transfer body. In the first transfer device, the first transfer member applies a voltage having a polarity opposite to the polarity in which the toner is charged to the intermediate transfer body. This causes the toner image to be first-transferred onto the outer peripheral surface of the intermediate transfer body.

Second Transfer Device

In the second transfer device, the second transfer member is disposed on a side of the intermediate transfer body on which the toner image is held. The second transfer device includes, for example, in addition to the second transfer member, a backing member disposed on a side of the intermediate transfer body which is opposite to the side on which the toner image is held. In the second transfer device, the intermediate transfer body and a recording medium are sandwiched between the second transfer member and the backing member to form a transfer electric field. This causes the toner image present on the intermediate transfer body to be second-transferred to the recording medium.

The second transfer member may be either a second transfer roller or a second transfer body. The backing member is, for example, a back roller.

Other Structure of Transfer Device

The transfer device according to this exemplary embodiment may be a transfer device that transfers a toner image onto the surface of a recording medium with a plurality of intermediate transfer bodies. That is, the transfer device may be, for example, a transfer device that first-transfers a toner image from an image holding member to a first intermediate transfer body, second-transfers the toner image from the first intermediate transfer body to a second intermediate transfer body, and third-transfers the toner image from the second intermediate transfer body to a recording medium.

Structure of Image Forming Apparatus

An example of the image forming apparatus according to the exemplary embodiment is described below with reference to the attached drawing. Note that the image forming apparatus according to the exemplary embodiment is not limited to this. Only the components illustrated in the drawings are described below, and the descriptions of the other components are omitted.

FIG. 1 is a schematic diagram illustrating an example of the image forming apparatus according to the exemplary embodiment.

An image forming apparatus 100 is, for example, an intermediate-transfer image forming apparatus illustrated in Figure, which is commonly referred to as a tandem image forming apparatus. The image forming apparatus 100 includes a plurality of image forming units 1Y, 1M, 1C, and 1K (examples of a toner image formation device) that form yellow (Y), magenta (M), cyan (C), and black (K) toner images by an electrophotographic system; a first transfer section 10 in which the yellow, magenta, cyan, and black toner images formed by the image forming units 1Y, 1M, 1C, and 1K are sequentially transferred (first transfer) to an intermediate transfer belt 15; a second transfer section 20 in which the superimposed toner images transferred on the intermediate transfer belt 15 are collectively transferred (second transfer) to a paper sheet K; and a fixing device 60 that fixes the image transferred on the paper sheet K by second transfer to the paper sheet K. The image forming apparatus 100 also includes a controller 40 that controls the operation of each of the devices and the sections.

Each of the image forming units 1Y, 1M, 1C, and 1K included in the image forming apparatus 100 includes a photosensitive member 11 (an example of the image holding member) that rotates in the direction of the arrow A, which holds a toner image formed on the surface.

The photosensitive member 11 is provided with a charger 12 (an example of the charging unit) and a laser exposure machine 13 (an example of the latent image forming unit) which are disposed on the periphery of the photosensitive member 11. The charger 12 charges the photosensitive member 11. The laser exposure machine 13 writes an electrostatic latent image on the photosensitive member 11 (in Figure, an exposure beam is denoted with Bm).

The photosensitive member 11 is also provided with a developing machine 14 (an example of the developing unit) and a first transfer roller 16 which are disposed on the periphery of the photosensitive member 11. The developing machine 14 includes a yellow, magenta, cyan, or black toner and visualizes the electrostatic latent image formed on the photosensitive member 11 with the toner. The first transfer roller 16 transfers the yellow, magenta, cyan, or black toner image formed on the photosensitive member 11 to the intermediate transfer belt 15 in the first transfer section 10.

The photosensitive member 11 is further provided with a photosensitive member cleaner 17 disposed on the periphery of the photosensitive member 11. The photosensitive member cleaner 17 removes toner particles remaining on the photosensitive member 11. The above-described electrophotographic devices, that is, the charger 12, the laser exposure machine 13, the developing machine 14, the first transfer roller 16, and photosensitive member cleaner 17, are sequentially arranged on the periphery of the photosensitive member 11 in the direction of the rotation of the photosensitive member 11. The image forming units 1Y, 1M, 1C, and 1K are arranged in a substantially linear manner in the order of yellow (Y), magenta (M), cyan (C), and black (K) in the direction of the rotation of the intermediate transfer belt 15.

The intermediate transfer belt 15 is driven in a circulatory manner (i.e., rotated), by various types of rollers at an intended speed in the direction of the arrow B illustrated in Figure. The various types of rollers include a driving roller 31 that is driven by a highly-constant-speed motor (not illustrated) and rotates the intermediate transfer belt 15; a support roller 32 that supports the intermediate transfer belt 15 that extends in a substantially linear manner in the direction in which the photosensitive members 11 are arranged; a tension roller 33 that applies tension to the intermediate transfer belt 15 and serves as a correction roller that prevents meandering of the intermediate transfer belt 15; a backing roller 25 disposed in the second transfer section 20; and a cleaning backing roller 34 which is arranged to face the intermediate transfer belt cleaning blade 35 and with which toner particles remaining on the intermediate transfer belt 15 are scraped off.

The first transfer section 10 is constituted by first transfer rollers 16 that are arranged to face the respective photosensitive members 11 across the intermediate transfer belt 15. The first transfer rollers 16 are arranged to be in pressure contact with the photosensitive members 11 with the intermediate transfer belt 15 interposed between the first transfer rollers 16 and the photosensitive members 11. The first transfer rollers 16 are supplied with a voltage (first transfer bias) having a polarity opposite to the polarity (negative; the same applies hereinafter) of charged toner particles. Accordingly, toner images formed on the photosensitive members 11 are electrostatically attracted to the intermediate transfer belt 15 sequentially to form superimposed toner images on the intermediate transfer belt 15.

The second transfer section 20 is constituted by the backing roller 25 and a second transfer roller 22 disposed on a side of the intermediate transfer belt 15 on which the toner image is held.

The backing roller 25 has a surface resistivity of $1\times10^{7}\Omega/\square$ or more and $1\times10^{10}\Omega/\square$ or less. The degree of hardness of the backing roller 25 is set to, for example, 70° ("ASKER C" produced by KOBUNSHI KEIKI CO., LTD.; the same applies hereinafter). The backing roller 25 is disposed on the rear surface-side of the intermediate transfer belt 15 and serves as a counter electrode for the second transfer roller 22. The backing roller 25 is provided with a power supplying roller 26 made of a metal, through which a second transfer bias is applied in a consistent manner.

The second transfer roller 22 is a hollow cylindrical roller having a volume resistivity of $10^{7.5}$ Ω·cm or more and $10^{8.5}$ Ω·cm or less. The second transfer roller 22 is arranged to be in pressure contact with the backing roller 25 with the intermediate transfer belt 15 interposed between the second transfer roller 22 and the backing roller 25. The second transfer roller 22 is grounded. A second transfer bias is formed between the second transfer roller 22 and the backing roller 25. Accordingly, the toner image is transferred (second transfer) to a paper sheet K transported to the second transfer section 20.

An intermediate transfer belt cleaning blade 35 is disposed on the intermediate transfer belt 15 at a position downstream of the second transfer section 20 such that the distance between the intermediate transfer belt cleaning blade 35 and the intermediate transfer belt 15 can be changed. The intermediate transfer belt cleaning blade 35 removes toner particles and paper dust particles that remain on the intermediate transfer belt 15 subsequent to the second transfer and cleans the outer peripheral surface of the intermediate transfer belt 15.

A second transfer roller cleaning member 22A is disposed on the second transfer roller 22 at a position downstream of the second transfer section 20. The second transfer roller cleaning member 22A removes toner particles and paper dust particles that remain on the second transfer roller 22 subsequent to the second transfer and cleans the outer peripheral surface of the intermediate transfer belt 15. An example of the second transfer roller cleaning member 22A is a cleaning blade. Alternatively, a cleaning roller may be used.

The intermediate transfer belt 15, the first transfer roller 16, the second transfer roller 22, and the intermediate transfer belt cleaning member 35 correspond to examples of the transfer device.

The image forming apparatus 100 may include a second transfer belt (an example of the second transfer member) instead of the second transfer roller 22.

A reference sensor (home position sensor) 42 is disposed upstream of the yellow image forming unit 1Y. The reference sensor (home position sensor) 42 generates a reference signal used as a reference to determine the timings at which images are formed in the image forming units 1Y, 1M, 1C, and 1K. An image density sensor 43 is disposed downstream of the black image forming unit 1K. The image density sensor 43 is used for adjusting image quality. The reference sensor 42 generates the reference signal upon recognizing a mark disposed on the back side of the intermediate transfer belt 15. Upon recognizing the reference signal, the controller 40 sends a command to the image forming units 1Y, 1M, 1C, and 1K. Each of the image forming units 1Y, 1M, 1C, and 1K starts forming an image in accordance with the command.

The image forming apparatus according to the exemplary embodiment further includes the following components as units for transporting paper sheets K: a paper tray 50 that contains paper sheets K; a paper feed roller 51 that draws and transports a paper sheet K stocked in the paper tray 50 at predetermined timings; transport rollers 52 that transport the paper sheet K drawn by the paper feed roller 51; a transport guide 53 with which the paper sheet K transported by the transport rollers 52 is fed into the second transfer section 20; a transport belt 55 that transports the paper sheet K that has been subjected to the second transfer with the second transfer roller 22 to the fixing device 60; and a fixing entrance guide 56 with which the paper sheet K is introduced into the fixing device 60.

A fundamental process for forming an image using the image forming apparatus, that is, an image forming method, according to the exemplary embodiment is described below.

In image forming apparatus according to the exemplary embodiment, image data sent from an image reading apparatus (not illustrated), a personal computer (PC, not illustrated), or the like are subjected to image processing using an image processing apparatus (not illustrated) and, subsequently, the image forming units 1Y, 1M, 1C, and 1K form images.

In the image processing apparatus, the input image data are subjected to image processing that includes various types of image editing, such as shading correction, misalignment correction, lightness/color space conversion, gamma correction, frame removal, color editing, and image moving. The image data that have been subjected to the image processing are converted into yellow, magenta, cyan, and black colorant gradation data and sent to the laser exposure machines 13.

In accordance with the colorant gradation data received by each of the laser exposure machines 13, the laser exposure machine 13 irradiates the photosensitive member 11 included in each of the image forming units 1Y, 1M, 1C, and 1K with an exposure beam Bm emitted from a semiconductor laser or the like. After the surface of the photosensitive member 11 of each of the image forming units 1Y, 1M, 1C, and 1K has been charged by the charger 12, the surface of the photosensitive member 11 is scanned by the laser exposure machine 13 and exposed to the beam and, consequently, an electrostatic latent image is formed on the surface of the photosensitive member 11. The electrostatic latent image is developed in each of the image forming units 1Y, 1M, 1C, and 1K as Y, M, C, or K toner image.

The toner images formed on the photosensitive members 11 of the image forming units 1Y, 1M, 1C, and 1K are transferred to the intermediate transfer belt 15 in the first transfer section 10 in which the photosensitive members 11 contact with the intermediate transfer belt 15. Specifically, in the first transfer section 10, the first transfer rollers 16 apply a voltage (first transfer bias) having a polarity opposite to the polarity (negative) of charged toner particles to the base of the intermediate transfer belt 15 and the toner images are sequentially superimposed on the outer peripheral surface of the intermediate transfer belt 15 (first transfer).

After the toner images have been sequentially transferred (first transfer) onto the outer peripheral surface of the intermediate transfer belt 15, the intermediate transfer belt 15 is moved and the toner images are transported to the second transfer section 20. When the toner images are transported to the second transfer section 20, in the transport unit, the paper feed roller 51 starts rotating and feeds a paper sheet K having an intended size from the paper tray 50 in synchronization with the transportation of the toner images to the second transfer section 20. The paper sheet K fed by the paper feed roller 51 is transported by the transport rollers 52 and reaches the second transfer section 20 through the transport guide 53. Before the paper sheet K reaches the second transfer section 20, the feeding of the paper sheet K is temporarily paused and an alignment between the paper sheet K and the toner images is made by an alignment roller (not illustrated) being rotated in synchronization with the movement of the intermediate transfer belt 15 on which the toner images are held.

In the second transfer section 20, the second transfer roller 22 is pressed by the backing roller 25 with the intermediate transfer belt 15 interposed between the second transfer roller 22 and the backing roller 25. The paper sheet K transported to the second transfer section 20 at the intended timing becomes inserted between the intermediate transfer belt 15 and the second transfer roller 22. Upon a voltage (second transfer bias) having a polarity that is the same as the polarity (negative) of charged toner particles being applied by the power supplying roller 26, a transfer electric field is generated between the second transfer roller 22 and the backing roller 25. The unfixed toner images held on the intermediate transfer belt 15 are electrostatically transferred to the paper sheet K collectively in the second transfer section 20, which is pressurized by the second transfer roller 22 and the backing roller 25.

The paper sheet K on which the toner images have been electrostatically transferred is subsequently removed from the intermediate transfer belt 15 and immediately transported by the second transfer roller 22 to the transport belt 55, which is disposed downstream of the second transfer roller 22 in the direction in which paper sheets are transported. The transport belt 55 transports the paper sheet K to the fixing device 60 in accordance with the transportation speed optimum for the fixing device 60. The unfixed toner images present on the paper sheet K transported to the fixing device 60 are fixed to the paper sheet K by heat and pressure in the fixing device 60. The paper sheet K on which the fixed image has been formed is transported to a paper eject tray (not illustrated) disposed in an ejecting section of the image forming apparatus.

Toner particles that remain on the intermediate transfer belt 15 after the termination of the transfer to the paper sheet K are transported to the intermediate transfer belt cleaning blade 35 due to the rotation of the intermediate transfer belt 15 and removed from the intermediate transfer belt 15 by the intermediate transfer belt cleaning blade 35.

The exemplary embodiments are described above. It should be understood that the above-described exemplary embodiments are not restrictive, and many modifications, variations, and improvements may be made to the exemplary embodiments.

EXAMPLES

Examples of the exemplary embodiment of the present disclosure are described below. Note that, the exemplary embodiment of the present disclosure is not limited by Examples below. In the following description, "part" and "%" are all on a mass basis.

Example 1

Preparation of Electrostatic Image Developer

Preparation of Amorphous Polyester Resin Dispersion Liquid

Preparation of Amorphous Polyester Resin Dispersion Liquid (APE1)

Terephthalic acid: 30 molar parts
Fumaric acid: 70 molar parts
Bisphenol A-ethylene oxide adduct: 5 molar parts
Bisphenol A-propylene oxide adduct: 95 molar parts The above materials are charged into a flask having a volume of 5 liters which is equipped with a stirring device, a nitrogen introduction tube, a temperature sensor, and a fractionating column. The temperature is increased to 210° C. over 1 hour. To 100 parts of the above materials, 1 part of titanium tetraethoxide is added. While the product water is distilled away, the temperature is increased to 230° C. over 0.5 hours. While the temperature is maintained at 230° C., the dehydration condensation reaction is continued for 1 hour. Then, the reaction product is cooled. Hereby, a polyester resin having a weight-average molecular weight of 18,500, an acid value of 14 mgKOH/g, and a glass transition temperature of 59° C. is synthesized.

Into a container equipped with a temperature control unit and a nitrogen purge unit, 40 parts of ethyl acetate and 25 parts of 2-butanol are charged in order to prepare a mixed solvent. To the mixed solvent, 100 parts of the polyester resin is gradually added in order to form a solution. To the solution, a 10-mass % aqueous ammonia solution is added in an amount that corresponds to three times the acid value of the resin in terms of molar ratio, and the resulting mixture is stirred for 30 minutes.

Subsequently, the inside of the container is purged with dry nitrogen. While the temperature is kept at 40° C. and the liquid mixture is stirred, 400 parts of ion-exchange water is added dropwise to the container at a rate of 2 part/min in order to perform emulsification. After the addition of ion-exchange water has been finished, the temperature of the emulsion is reduced to room temperature (20° C. to 25° C.). Subsequently, while stirring is performed, bubbling is performed for 48 hours using dry nitrogen in order to reduce the concentration of ethyl acetate and 2-butanol in the resulting dispersion liquid to 1,000 ppm or less. Hereby, a resin particle dispersion liquid including resin particles having a volume-average size of 200 nm dispersed therein is prepared. Then, ion-exchange water is added to the resin particle dispersion liquid in order to adjust the solid content to 20% by mass. Hereby, a polyester resin particle dispersion liquid (APE1) is prepared.

Preparation of Crystalline Resin Particle Dispersion Liquid

Preparation of Crystalline Polyester Resin Dispersion Liquid (CPE1)

1,10-Dodecanedioic acid: 225 parts
1,6-Hexanediol: 143 parts

The above materials are charged into a reactor equipped with a stirring device, a nitrogen introduction tube, a temperature sensor, and a fractionating column. The temperature is increased to 160° C. over 1 hour. To the reactor, 0.8 parts by mass of dibutyltin oxide is added. While the product water is distilled away, the temperature is increased to 180° C. over 6 hours. While the temperature is maintained at 180° C., the dehydration condensation reaction is continued for 5 hours. Subsequently, the temperature is gradually increased to 230° C. under reduced pressure. While the temperature is maintained at 230° C., stirring is performed for 2 hours. Then, the reaction product is cooled. After cooling, solid-liquid separation is performed to dry the solid substance. Hereby, a crystalline polyester resin is prepared.

Crystalline polyester resin: 100 parts
Methyl ethyl ketone: 40 parts
Isopropyl alcohol: 30 parts
10% Aqueous ammonia solution: 6 parts The above materials are charged into a jacketed 3-liter reaction tank ("BJ-30N" produced by TOKYO RIKAKIKAI CO, LTD.) equipped with a condenser, a thermometer, a water dropper, and an anchor impeller. While the temperature is maintained at 80° C. with a water circulation thermostat, the resin is dissolved by performing stirring at 100 rpm. Then, the temperature of the water circulation thermostat is set to 50° C., and 400 parts of ion-exchange water maintained at 50° C. is added dropwise at a rate of 7 mass part/min in total in order to perform phase inversion. Hereby, an emulsion is prepared. Into a 2-liter eggplant flask, 576 parts by mass of the emulsion and 500 parts by mass of ion-exchange water are charged. The eggplant flask is connected to an evaporator (produced by TOKYO RIKAKIKAI CO, LTD.) equipped with a vacuum control unit with a trap ball interposed therebetween. While the eggplant flask is rotated, the temperature is increased in a hot-water bath at 60° C. With attention to bumping, the pressure is reduced to 7 kPa to remove the solvent. The volume average size D50v of the resin particles included in the dispersion liquid is 185 nm. Subsequently, ion-exchange water is added to the dispersion liquid. Hereby, a crystalline resin particle dispersion liquid (CPE1) having a solid content of 22.1% is prepared.

Preparation of Colorant Particle Dispersion Liquid

Preparation of Colorant Particle Dispersion Liquid (Black Pigment Dispersion Liquid)

Carbon black ("Regal330" produced by Cabot Corporation): 250 parts
Anionic surfactant ("NEOGEN SC" produced by DKS Co. Ltd.): 33 parts (active component: 60%, 8% relative to the colorant)

Ion-exchange water: 750 parts

Into a stainless steel container having a volume such that, when all the components are charged into the container, the liquid level of the container reaches about ⅓ of the height of the container, 280 parts of ion-exchange water and 33 parts of the anionic surfactant are charged. After the surfactant has been dissolved in water to a sufficient degree, the whole amount of the solid pigment is charged into the container, and the resulting mixture is stirred with a stirrer until all of the pigment particles become wet, while degassing is performed to a sufficient degree. Subsequent to the degassing, the remaining part of the ion-exchange water is added to the container. After dispersion has been performed with a homogenizer ("ULTRA-TURRAX T50" produced by IKA) at 5,000 rotations for 10 minutes, stirring is performed with a stirrer a whole day and night to perform degassing. Subsequent to the degassing, dispersion is again performed with a homogenizer at 6,000 rotations for 10 minutes. Then, stirring is performed with a stirrer a whole day and night to perform degassing. Subsequently, the dispersion liquid is dispersed at a pressure of 240 MPa with a high-pressure impact disperser Ultimaizer ("HJP30006" produced by Sugino Machine Limited). Dispersion is performed for 25 paths in accordance with the total amount of materials charged and the treatment capacity of the device. The resulting dispersion liquid is left to stand for 72 hours in order to remove the precipitates. Then, ion-exchange water is added to the dispersion liquid to adjust the solid content in the dispersion liquid to 15%. Hereby, a colorant particle dispersion liquid is prepared. The volume average size D50 of the particles included in the colorant particle dispersion liquid is 135 nm.

Preparation of Release Agent Dispersion Liquid

Preparation of Release Agent Dispersion Liquid (WAX1)

Paraffin wax ("HNP9" produced by Nippon Seiro Co., Ltd., melting temperature: 75° C.): 270 parts Anionic surfactant ("NEOGEN RK" produced by Daiichi Kogyo Seiyaku Co., Ltd., active component: 60%): 13.5 parts (as an active component, 3.0% relative to release agent)

Ion-exchange water: 21.6 parts

The above components are mixed with one another, and the resulting mixture is subjected to a pressure-discharge-type homogenizer ("Gaulin Homogenizer" produced by Gaulin) at a liquid temperature of 120° C. in order to dissolve the release agent. Subsequently, dispersion is performed at a pressure of 5 MPa for 120 minutes and at 40 MPa for another 360 minutes. Then, the dispersion liquid is cooled. Hereby, a release agent dispersion liquid (WAX1) is prepared. The volume average size D50 of the particles included in the release agent dispersion liquid (WAX1) is 225 nm. The solid content in the release agent dispersion liquid (WAX1) is adjusted to 20.0% by the addition of ion-exchange water.

Preparation of Mixed Particle Dispersion Liquid

Preparation of Mixed Particle Dispersion Liquid (RW1)

With 150 parts of the polyester resin particle dispersion liquid (APE1), 20 parts of the release agent particle dispersion liquid (WAX1) and 2.9 parts of an anionic surfactant ("Dowfax2A1" produced by The Dow Chemical Company) are mixed. To the resulting mixture, 1.0% nitric acid is added at 25° C. in order to adjust the pH to 3.0. Hereby, a mixed particle dispersion liquid (RW1) is prepared.

Preparation of Toner

Polyester resin particle dispersion liquid (APE1): 600 parts

Crystalline resin particle dispersion liquid (CPE1): 120 parts

Colorant particle dispersion liquid: 133 parts

Ion-exchange water: 400 parts

Anionic surfactant ("Dowfax2A1" produced by The Dow Chemical Company): 2.9 parts The above components are charged into a 3-liter reaction container equipped with a thermometer, a pH meter, and a stirrer. After the pH of the resulting mixture has been adjusted to 3.0 by the addition of 1.0% nitric acid at 25° C., while dispersion is performed with a homogenizer ("ULTRA-TURRAX T50" produced by IKA) at 5,000 rpm, 130 parts of the aqueous aluminum sulfate solution is added to the reaction container. Subsequently, dispersion is performed for 6 minutes.

Subsequently, a stirrer and a heating mantle are placed in the reaction container. While the rotational speed of the stirrer is adjusted such that the slurry can be stirred to a sufficient degree, the temperature is increased to 40° C. at a heating rate of 0.2° C./min and, after the temperature has reached 40° C., at a heating rate of 0.05° C./min. The particle sizes are measured with "MULTISIZER II" (aperture diameter: 50 μm, produced by Beckman Coulter, Inc.) every 10 minutes. When the volume average particle size reaches 5.0 μm, the temperature is maintained and 450 parts of the mixed particle dispersion liquid (RW1) is charged into the reaction container over 5 minutes. After holding has been performed for 30 minutes, the pH is adjusted to 9.0 using a 1% aqueous sodium hydroxide solution. Subsequently, the temperature is increased to 85° C. at a heating rate of 1° C./min while the pH is adjusted to 9.0 in the same manner as above at intervals of 5° C., and holding is performed at 85° C. When the dispersion liquid is inspected for particle shape and surface quality with an optical microscope and a scanning electron microscope (FE-SEM), the coalescence of particles is confirmed after the lapse of 5.0 hours. Then, the container is cooled to 30° C. over 5 minutes using cooling water.

The cooled slurry is passed through a nylon mesh having an opening of 15 μm in order to remove coarse powder particles. The toner slurry that has passed through the mesh is subjected to vacuum filtration with an aspirator. The toner that remains on the filter paper is crushed into small particles by fingers and charged into an amount of ion-exchange water ten times the amount of the toner at 30° C. Then, stirring is performed for 30 minutes. Subsequently, vacuum filtration is performed with an aspirator, and the toner that remains on the filter paper is crushed into small particles by fingers and charged into an amount of ion-exchange water ten times the amount of the toner at 30° C. Then, stirring is performed for 30 minutes. Subsequently, vacuum filtration is again performed with an aspirator, and the electric conductivity of the filtrate is measured. The above operation is repeated until the electric conductivity of the filtrate reaches 10 μS/cm or less in order to clean the toner. The cleaned toner is pulverized with a wet/dry sizer ("COMIL") and then vacuum-dried for 36 hours in an oven at 35° C. Hereby, toner particles are prepared.

Then, 3.3 parts of silica particles, which serve as an external additive, are added to 100 parts of toner particles. The resulting mixture is stirred for 3 minutes with a Henschel mixer at a peripheral speed of 30 m/s. Subsequently, sieving is performed with a vibration sieve having an opening of 45 μm. Hereby, a toner is prepared.

Preparation of Carrier

Into a Henschel mixer, 500 parts of spherical magnetite powder particles having a volume-average size of 0.18 μm are charged. After stirring has been performed to a sufficient degree, 5 parts of a titanate coupling agent is added to the mixer. Then, the temperature is increased to 95° C. and the resulting mixture is stirred for 30 minutes. Hereby, spherical magnetite particles covered with the titanate coupling agent are prepared.

Subsequently, 6 parts of phenol, 10 parts of 30% formalin, 500 parts of magnetite particles, 7 parts of 25% ammonia water, and 400 parts of water are charged into a 1-liter four-necked flask, and the resulting mixture is stirred. While being stirred, the mixture is heated to 90° C. over 60 minutes and reacted at 90° C. for 180 minutes. Then, the temperature is reduced to 30° C. and 500 ml of water is added. The resulting supernatant is removed, and the precipitate is washed with water. The precipitate is dried at 180° C. under reduced pressure and coarse powder particles are removed through a screen having an opening of 106 μm. Hereby, core particles having an average size of 38 μm are prepared.

With 200 parts of toluene, 35 parts of a styrene-methyl methacrylate copolymer (molar ratio: 10:90, weight-average molecular weight: 160,000) is mixed and the resulting mixture is stirred for 90 minutes with a stirrer. Hereby, a coat resin solution is prepared.

Into a vacuum deaeration kneader coater (clearance between rotor and wall: 35 mm), 1,000 parts of the core particles and 70 parts of the coat resin solution are charged. The resulting mixture is stirred for 30 minutes at 30 rpm while the temperature is maintained at 65° C. Then, the temperature is set to 88° C., and the removal of toluene by distillation, deaeration, and drying are performed under reduced pressure. The product is passed through a mesh having an opening of 75 μm. The carrier has a shape factor SF2 of 104.

Preparation of Developer

With 8 parts of the toner, 100 parts of the carrier is mixed using a V-blender. Hereby, a developer is prepared.

Physical Property of Toner

The proportion of the release agent present in a region that extends 800 nm below the surfaces of the toner particles relative to all the release agent included in the toner particles (i.e., the surface-layer proportion of the release agent) is determined using the above-described method. Moreover, the melting temperature of the release agent is measured using the above-described method.

Preparation of Cleaning Blade

A polycaprolactone polyol "PLACCEL 205" produced by Daicel Corporation, and a polycaprolactone polyol "PLACCEL 240" produced by Daicel Corporation are used as materials for the hard segment of the polyol component. An acrylic resin "Actflow UMB-2005B" produced by Soken Chemical & Engineering Co., Ltd. which includes two or more hydroxyl groups is used as a material for the soft segments. The above hard and soft segment materials are mixed with one another at a mass ratio of 8:2.

To 100 parts of a mixture of the hard and soft segment materials, 40 parts of silica particles are added, and the resulting mixture is stirred. Subsequently, 4,4'-diphenylmethane diisocyanate "Millionate MT" produced by Nippon Polyurethane Industry Co., Ltd., which is used as an isocyanate compound, is further added to the mixture, and a reaction is conducted at 70° C. for 3 hours in a nitrogen atmosphere. Then, the isocyanate compound is further added to the mixture. Subsequently, a reaction is conducted at 70° C. for 3 hours in a nitrogen atmosphere. Hereby, a prepolymer is formed.

The prepolymer is heated to 100° C. and then degassed for 1 hour under reduced pressure. A mixture of 1,4-butanediol and trimethylolpropane is added to the prepolymer, and the resulting mixture is stirred for 3 minutes such that air bubbles do not enter the mixture. The mixture is then charged into a centrifugal molding machine and caused to cure. The cured body is cut to a length of 15 mm and a thickness of 2 mm. Hereby, a cleaning blade precursor is formed.

Modification Treatment of Contact Portion

The contact portion of the edge layer of the cleaning blade precursor which comes into contact with an intermediate transfer belt is subjected to a surface modification treatment using a silicone polymer in the following manner.

The silicone polymer used is "MODIPER FS770" produced by NOF CORPORATION. In the surface modification treatment, the cleaning blade precursor is immersed in a surface-treatment liquid, which is prepared by mixing 100 parts of methyl ethyl ketone (MEK) with 20 parts of 4,4'-diphenylmethane diisocyanate (4,4-MDI) and 2 parts of a silicone polymer and dispersing the resulting mixture for 3 hours with a ball mill, for 60 seconds, subsequently removed from the liquid, and then dried with an oven at 50° C.

A cleaning blade with a length 15 mm and a thickness of 2 mm which has a surface-modified contact portion that comes into contact with an intermediate transfer belt is prepared by the above operation.

Physical Properties of Cleaning Blade

The following physical properties of the cleaning blade are measured using the above-described methods.

- Hardness of the blade contact portion
- Plastic deformation power of the blade contact portion
- Si content XA at the surface of the blade contact portion.
- Si content XB at the depth of 50 nm below the surface of the blade contact portion Preparation of Intermediate Transfer Belt Carbon black particles are dispersed in a polyamic acid solution to prepare a coating liquid 1. The coating liquid is applied to a cylindrical die to form a coating film, which is subjected to a drying treatment (substrate 1).

Carbon black particles are dispersed in a polyamic acid solution to prepare a coating liquid 2. The coating liquid 2 is applied to the substrate 1 and a drying treatment is subsequently performed. Then, after a baking step has been conducted, cutting is performed.

A polyimide intermediate transfer belt is prepared by the above-described steps.

Image Forming Apparatus

The electrostatic image developer, the intermediate transfer belt, and the cleaning blade for the intermediate transfer belt prepared as described above are attached to an image forming apparatus "Apeosport-VI C7771" produced by FUJIFILM Business Innovation Corp.

As for the conditions under which the cleaning blade for the intermediate transfer belt is attached to the image forming apparatus, the pressing force NF (normal force, gf/mm) is set as described in Table 1, and the angle W/A (working angle) is set to 10°.

Examples 2 to 11 and Comparative Examples 1 to 6

Preparation of Electrostatic Image Developer

Toner particles that satisfy the "Surface-layer proportion of the release agent (%)" and "Melting temperature of release agent (° C.)" described in Table 1 are prepared by selecting the release agent used for preparing the release agent dispersion liquid in Example 1 and adjusting the amount of the mixed particle dispersion liquid (RW1) used for preparing the toner. An electrostatic image developer is prepared using the toner particles.

The following release agents are used alone or in combination with two or more as a release agent having the melting temperature described in Table 1.

- Paraffin wax (produced by Nippon Seiro Co., Ltd., melting temperature: 64° C.)
- Paraffin wax ("HNP9" produced by Nippon Seiro Co., Ltd., melting temperature: 75° C.)
- Ester wax (produced by NOF CORPORATION, melting temperature: 82° C.)
- Mixed wax including a paraffin wax (produced by Nippon Seiro Co., Ltd., melting temperature: 64° C.) and a paraffin wax ("HNP9" produced by Nippon Seiro Co., Ltd., melting temperature: 75° C.) (the melting temperature is adjusted to 65° C. by adjusting the proportions of the above waxes)

Mixed wax including a paraffin wax ("HNP9" produced by Nippon Seiro Co., Ltd., melting temperature: 75° C.) and an ester wax (produced by NOF CORPORATION, melting temperature: 82° C.) (the melting temperature is adjusted to 80° C. by adjusting the proportions of the above waxes)

Preparation of Cleaning Blade

A cleaning blade having the physical properties described in Table 1 is prepared by adjusting the ratio between the hard and soft segments, the amount of silica particles, and the amount of time during which immersion in the surface treatment liquid is performed in Example 1.

The pressing force NF (gf/mm) at which the cleaning blade is attached to the image forming apparatus is set as described in Table 1.

Evaluation Tests

Colored Streaks (Pass-Through of Toner Particles)

One of the image forming apparatuses prepared in Examples and Comparative Examples is left to stand in a high-temperature, high-humidity environment (28° C./80% RH) for a day. Subsequently, an image having an area coverage of 1% is formed on 10,000 paper sheets under the same conditions as above. The occurrence of colored streaks is evaluated in accordance with the standard below. It is considered the samples evaluated as G1 to G3 are acceptable.

- G1: Colored streaks do not occur.
- G2: Colored streaks occur after 8,000 to 10,000 sheets have been printed.
- G3: Colored streaks occur after 6,000 to 7,999 sheets have been printed.
- G4: Colored streaks occur after 4,500 to 5,999 sheets have been printed.
- G5: Colored streaks occur after 4,499 sheets or less have been printed.

Low-Temperature Fixability

Using one of the image forming apparatuses prepared in Examples and Comparative Examples, a 50 mm×50 mm image having an area coverage of 100% is formed on A4-size OS Coat W paper sheets (basis weight: 127 gsm) produced by FUJIFILM Business Innovation Corp. at a toner deposition density of 0.45 mg/cm$^2$.

As for the fixing conditions, the nip pressure is set to 4.0 kgf/cm$^2$, and the fusing temperature is set to 140° C.

Subsequently, the image is folded and the quality of the image is evaluated in terms of the degree of image loss at the folded portion.

- G1: Image loss is absent.
- G2: Image loss is present but insignificant.
- G3: Image loss is slightly present but acceptable.
- G4: Image loss is present.

Blade Noise

One of the image forming apparatuses prepared in Examples and Comparative Examples is left to stand in a high-temperature, high-humidity environment (28° C./80% RH) for a day. Subsequently, an image having an area coverage of 1% is formed on 100 paper sheets under the same conditions as above. The loudness of the noise generated by vibration of the cleaning blade during the above image formation is evaluated in accordance with the standard below. It is considered the samples evaluated as A and B are acceptable.

- A: Only the noise generated by operation of the apparatus is audible.
- B: The noise of the cleaning blade is slightly audible in addition to the noise generated by operation of the apparatus.
- C: The noise of the cleaning blade is significant and any person considers the noise hurting the ears.

TABLE 1

| | Toner | | Cleaning blade | | | | | | | Evaluations | | |
|---|---|---|---|---|---|---|---|---|---|---|---|---|
| | Proportion of release agent in surface layer % | Melting temperature of release agent ° C. | Silica particles added relative to polyurethane Amount (%) | Hardness ° | Plastic deformation power % | Si content at surface XA atm % | Si content at 50-nm depth XB atm % | XB/XA — | Blade pressing force gf/mm | Colored streaks | Low-temperature fixability | Blade noise |
| Example 1 | 75 | 75 | 20 | 90 | 10 | 20 | 18 | 0.90 | 3.0 | G1 | G1 | A |
| Example 2 | 75 | 80 | 18 | 90 | 10 | 18 | 17 | 0.94 | 3.0 | G1 | G2 | A |
| Example 3 | 70 | 80 | 18 | 90 | 10 | 18 | 17 | 0.94 | 3.0 | G1 | G3 | A |
| Example 4 | 75 | 65 | 20 | 85 | 8 | 20 | 18 | 0.90 | 3.0 | G2 | G1 | B |
| Example 5 | 75 | 75 | 14 | 85 | 8 | 15 | 12 | 0.80 | 3.0 | G3 | G1 | B |
| Example 6 | 80 | 80 | 20 | 95 | 12 | 20 | 18 | 0.90 | 3.6 | G3 | G2 | A |
| Example | 70 | 75 | 20 | 90 | 10 | 20 | 18 | 0.90 | 1.4 | G3 | G2 | A |

TABLE 1-continued

| | Toner | | Cleaning blade | | | | | | | Evaluations | | |
|---|---|---|---|---|---|---|---|---|---|---|---|---|
| | Proportion of release agent in surface layer % | Melting temperature of release agent ° C. | Silica particles added relative to polyurethane Amount (%) | Hardness ° | Plastic deformation power % | Si content at surface XA atm % | Si content at 50-nm depth XB atm % | XB/XA — | Blade pressing force gf/mm | Colored streaks | Low-temperature fixability | Blade noise |
| 7 | | | | | | | | | | | | |
| Example 8 | 70 | 75 | 20 | 90 | 10 | 20 | 18 | 0.90 | 4.6 | G3 | G2 | A |
| Example 9 | 75 | 75 | 25 | 88 | 8 | 26 | 20 | 0.77 | 3.0 | G2 | G1 | B |
| Example 10 | 75 | 75 | 15 | 85 | 4 | 15 | 13 | 0.87 | 3.0 | G3 | G1 | C |
| Example 11 | 75 | 75 | 25 | 86 | 6 | 23 | 22 | 0.96 | 3.0 | G2 | G1 | B |
| Comparative Example 1 | 65 | 75 | 20 | 90 | 10 | 20 | 18 | 0.90 | 3.0 | G1 | G4 | A |
| Comparative Example 2 | 70 | 64 | 20 | 90 | 10 | 20 | 18 | 0.90 | 3.0 | G4 | G1 | A |
| Comparative Example 3 | 70 | 82 | 19 | 90 | 10 | 18 | 18 | 1.00 | 3.0 | G1 | G5 | A |
| Comparative Example 4 | 75 | 80 | 15 | 84 | 7 | 16 | 15 | 0.94 | 3.0 | G4 | G2 | C |
| Comparative Example 5 | 75 | 80 | 33 | 96 | 13 | 28 | 27 | 0.96 | 3.0 | G5 | G2 | A |
| Comparative Example 6 | 75 | 80 | 12 | 90 | 12 | 14 | 12 | 0.86 | 3.0 | G5 | G2 | A |

The above-described results confirm that the image forming apparatuses prepared in Examples may reduce the likelihood of colored streaks being formed as a result of faulty cleaning while achieving low-temperature fixability, compared with the image forming apparatuses prepared in Comparative Examples.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1))) An image forming apparatus including:

an electrostatic image developer including a toner including toner particles, the toner particles including a release agent, an amount of the release agent present in a region that extends 800 nm below surfaces of the toner particles being 70% or more of the total amount of the release agent included in the toner particles, the release agent having a melting temperature of 65° C. or more and 80° C. or less;

a member that is to be cleaned; and a cleaning blade arranged to come into contact with an outer peripheral surface of the member, the cleaning blade being capable of removing the toner adhered on a surface of the member, the cleaning blade including a contact portion arranged to come into contact with the member, the contact portion including a polyurethane, the contact portion having a hardness of 85° or more and 95° or less and a plastic deformation power of 12% or less, a Si content at a surface of the contact portion being 15 atm % or more.

(((2))) The image forming apparatus according to (((1))), wherein the plastic deformation power is 10% or less.

(((3))) The image forming apparatus according to (((1))) or (((2))), wherein the Si content at the surface of the contact portion is 20 atm % or more.

(((4))) The image forming apparatus according to any one of (((1))) to (((3))), wherein, when the Si content at the surface of the contact portion is defined as XA, and a Si content at a depth of 50 nm below the surface of the contact portion is defined as XB, XB/XA is 0.8 or more.

(((5))) The image forming apparatus according to (((4))), wherein the XB/XA is 0.9 or more.

(((6))) The image forming apparatus according to any one of (((1))) to (((5))), wherein the contact portion includes a Si-containing compound.

(((7))) The image forming apparatus according to any one of (((1))) to (((6))), wherein the cleaning blade is arranged to come into contact with the member at a pressing force of 1.5 gf/mm or more and 4.5 gf/mm or less.

What is claimed is:

1. An image forming apparatus comprising:

an electrostatic image developer including a toner including toner particles, the toner particles including a release agent, an amount of the release agent present in a region that extends 800 nm below surfaces of the toner particles being 70% or more of the total amount of the release agent included in the toner particles, the release agent having a melting temperature of 65° C. or more and 80° C. or less;

a member that is to be cleaned; and a cleaning blade arranged to come into contact with an outer peripheral surface of the member, the cleaning blade being capable of removing the toner adhered on a surface of the member, the cleaning blade including a contact portion arranged to come into contact with the member, the contact portion including a polyurethane, the contact portion having a hardness of 85° or more and 95° or less and a plastic deformation power of 12% or less, a Si content at a surface of the contact portion being 15 atm % or more.

2. The image forming apparatus according to claim 1, wherein the plastic deformation power is 10% or less.

3. The image forming apparatus according to claim 1, wherein the Si content at the surface of the contact portion is 20 atm % or more.

4. The image forming apparatus according to claim 1, wherein, when the Si content at the surface of the contact portion is defined as XA, and a Si content at a depth of 50 nm below the surface of the contact portion is defined as XB, XB/XA is 0.8 or more.

5. The image forming apparatus according to claim 4, wherein the XB/XA is 0.9 or more.

6. The image forming apparatus according to claim 1, wherein the contact portion includes a Si-containing compound.

7. The image forming apparatus according to claim 1, wherein the cleaning blade is arranged to come into contact with the member at a pressing force of 1.5 gf/mm or more and 4.5 gf/mm or less.

* * * * *